United States Patent

Ohtsuka et al.

[11] Patent Number: 5,975,673
[45] Date of Patent: Nov. 2, 1999

[54] IMAGE OUTPUT METHOD AND APPARATUS FOR SMOOTHING IMAGE DATA BY MANIPULATING DOT SIZES

[75] Inventors: Naoji Ohtsuka, Yokohama; Nobuyuki Kuwabara, Kawasaki; Isao Ebisawa, Yokohama; Atsushi Arai; Hisao Yaegashi, both of Kawasaki; Toshiharu Inui; Kentaro Yano, both of Yokohama; Kiichiro Takahashi, Kawasaki; Osamu Iwasaki, Tokyo; Daigoro Kanematsu, Yokohama, all of Japan

[73] Assignee: Canon Kabushiki Kaisha, Tokyo, Japan

[21] Appl. No.: 08/911,348

[22] Filed: Aug. 7, 1997

Related U.S. Application Data

[63] Continuation of application No. 08/329,071, Oct. 25, 1994, abandoned.

[30] Foreign Application Priority Data

Oct. 28, 1993 [JP] Japan .................................. 5-270349
Oct. 17, 1994 [JP] Japan .................................. 6-250872

[51] Int. Cl.⁶ .............................. B41J 2/205; H04N 1/387
[52] U.S. Cl. ................................................. 347/15; 358/453
[58] Field of Search ................................. 347/9, 15, 131, 347/240, 254; 358/298, 538, 453, 454, 462, 464

[56] References Cited

U.S. PATENT DOCUMENTS

| | | | |
|---|---|---|---|
| 2,625,222 | 1/1953 | Frye | 340/390.6 |
| 4,313,124 | 1/1982 | Hara | 347/57 |
| 4,345,262 | 8/1982 | Shirato et al. | 347/10 |
| 4,386,272 | 5/1983 | Check, Jr. et al. | 250/236 |
| 4,459,600 | 7/1984 | Sato et al. | 347/47 |
| 4,463,359 | 7/1984 | Ayata et al. | 347/56 |
| 4,544,264 | 10/1985 | Bassetti et al. | 347/129 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 4,809,021 | 2/1989 | Check et al. | 347/15 |
| 4,933,689 | 6/1990 | Yoknis | 347/131 |
| 5,208,605 | 5/1993 | Drake | 347/40 |
| 5,241,324 | 8/1993 | Tamura et al. | 347/240 |
| 5,280,310 | 1/1994 | Otsuka et al. | 347/12 |
| 5,321,433 | 6/1994 | Zulian | 347/131 |
| 5,359,355 | 10/1994 | Nagoshi et al. | 347/9 |

FOREIGN PATENT DOCUMENTS

| | | |
|---|---|---|
| 0 389 298 | 9/1990 | European Pat. Off. . |
| 0 467 598 | 1/1992 | European Pat. Off. . |
| 0513989 | 11/1992 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |
| 60-258584 | 12/1985 | Japan . |
| WO 88/06524 | 9/1988 | WIPO . |

*Primary Examiner*—John Barlow
*Assistant Examiner*—Craig A. Hallacher
*Attorney, Agent, or Firm*—Fitzpatrick, Cella, Harper & Scinto

[57] ABSTRACT

According to an image processing method and apparatus of the present invention, an outline portion is extracted from input image data, and a pixel whose dot size is to be changed is extracted. The input image data is printed without any change, and the pixel whose dot size is to be changed is overlap-printed while the dot size is increased. Therefore, smoothing can be sufficiently performed in both the main scanning direction and the sub-scanning direction without increasing the dot density and decreasing the recording speed.

30 Claims, 19 Drawing Sheets

| | DETERMINATION CONDITIONS | PROCESS CONDITIONS |
|---|---|---|
| ● | PRINT DESIGNATION | PRINT |
| ◐ | PRINT DESIGNATION | PRINT AFTER INCREASE IN DOT SIZE |
| ⊕ | NON-PRINT DESIGNATION | NON-PRINT |
| ○ | NON DETERMINATION | NON-PROCESS |
| ⦿ | PRINT DESIGNATION | NON-PRINT |

UNIT μm

LINE TO BE OBTAINED UPON SMOOTHING

UNIT μm

UNIT μm

IMAGE OUTPUT METHOD AND APPARATUS FOR SMOOTHING IMAGE DATA BY MANIPULATING DOT SIZES

This application is a continuation of application Ser. No. 08/329,071 filed Oct. 25, 1994, now abandoned.

BACKGROUND OF THE INVENTION

The present invention relates to an image output method and apparatus and, more particularly, to an image output method and apparatus suitable for performing image output by, e.g., an ink-jet system.

Generally, an image output apparatus such as a printer, a copying machine, and a facsimile apparatus records, as an output image, an image consisting of a dot pattern on a recording medium such as a paper sheet or a plastic thin plate on the basis of input image information.

Such image output apparatuses can be classified into an ink-jet system, a wire-dot system, a thermal system, a laser beam system, and the like depending on their recording methods. Of these systems, the ink-jet system (ink-jet printer) ejects and flies ink droplets (recording liquid) from the ejection orifices of a recording head and sticks them to a recording medium, thereby recording an image.

Along with the recent spread of the image output apparatuses, there have been strong needs for high-speed recording, high resolution, high image quality, low noise, and the like. The ink-jet printer is an image output apparatus meeting these requirements.

As one of values added, a high image quality has been required in the image output apparatus of an electrophotographic system in recent years, and various smoothing techniques have been developed. To perform smoothing, basically, the resolution of all image data can be increased. However, when the resolution is simply increased, the number of data is largely increased.

For this reason, a conventional method is mainly used in which a target smoothing portion is extracted from image data with a resolution of, e.g., 300 DPI, and only the extracted portion is interpolated and drawn at a dot density of, e.g., 600 or 1,200 DPI.

The above method is disclosed in U.S. Pat. Nos. 4,544, 264, 2,625,222, 4,933,689, and the like.

In U.S. Pat. Nos. 4,544,264 and the like, the prior-art invention has been made on the basis of the characteristics of the electrophotographic technique. More specifically, one of basic smoothing techniques, the resolution of raster data is increased. A polygon mirror is rotated at a higher speed than a normal speed, and the density of a raster interval is increased, thereby obtaining a higher resolution of the raster data. Smoothing is performed by using this high resolution and adding dots having a medium size or density.

However, the conventional method has the following problems.

The conventional smoothing processing is appropriately used for the electrophotographic system using one light beam. However, this method is inappropriate for a recording system such as an ink-jet system using a multi-nozzle, a thermal transfer system, and a sublimation system because the dot density is basically determined by the integration density of recording elements.

If a recording head having nozzles with a resolution of 300 DPI is used in an inclined state, the dot density can be increased to about 600 DPI. In this case, however, the dot density of the recording head is fixed at 600 DPI and cannot be returned to 300 DPI.

In a serial scanning system, when a recording frequency is raised in the scanning direction of a carriage, recording at a resolution of 600 DPI can be performed by nozzles at a pitch of 300 DPI only in the main scanning direction. In this case, a large smoothing effect can be obtained as for an oblique line having a gradient close to a direction perpendicular to the main scanning direction. However, few effect are obtained for an oblique line having a gradient close to the main scanning direction.

Assume that a circle is drawn with a thin line. In this case, as shown in FIG. 5 (to be described later), a portion improved by smoothing and a non-smoothed portion are simultaneously present, resulting in an unnatural circle.

If the dot density is to be increased in the main scanning direction of the carriage in the serial scanning system, and the maximum recording frequency of the recording head is kept unchanged, the speed of the carriage must be reduced to ½ or ¼, resulting in a large decrease in recording speed. Even when the frequency can be increased, members with a large mass, i.e., the carriage or a head ink tank must be moved at a high speed. This causes a large decrease in energy efficiency and makes it difficult to efficiently perform smoothing as in a laser beam printer.

SUMMARY OF THE INVENTION

Accordingly, it is an object of the present invention to provide an image output method and apparatus of an ink-jet recording system capable of sufficiently performing smoothing without adding a higher-solution addressing function and a memory.

There is also provided an image output method and apparatus of an ink-jet system capable of sufficiently performing smoothing in both a main scanning direction and a sub-scanning direction without limiting a direction of an oblique line.

There is also provided an image output method and apparatus of an ink-jet system capable of sufficiently performing smoothing without a decrease in recording speed.

There is also provided an image output method and apparatus of an ink-jet system which controls not to overlap dots, thereby saving a recording agent.

There is also provided an image output method and apparatus of an ink-jet system which prevents unnecessary permeation caused by overejection of a recording agent, thereby preventing diffusion of the recording agent between adjacent dots.

There is also provided an image output method and apparatus of an ink-jet system capable of performing smoothing by using recording agents of different colors.

There is also provided an image output method and apparatus of an ink-jet system capable of performing smoothing by using recording agents having different concentrations.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

An embodiment according to the present invention will be described below in detail with reference to the accompanying drawings.

<First Embodiment>

Figure 1:
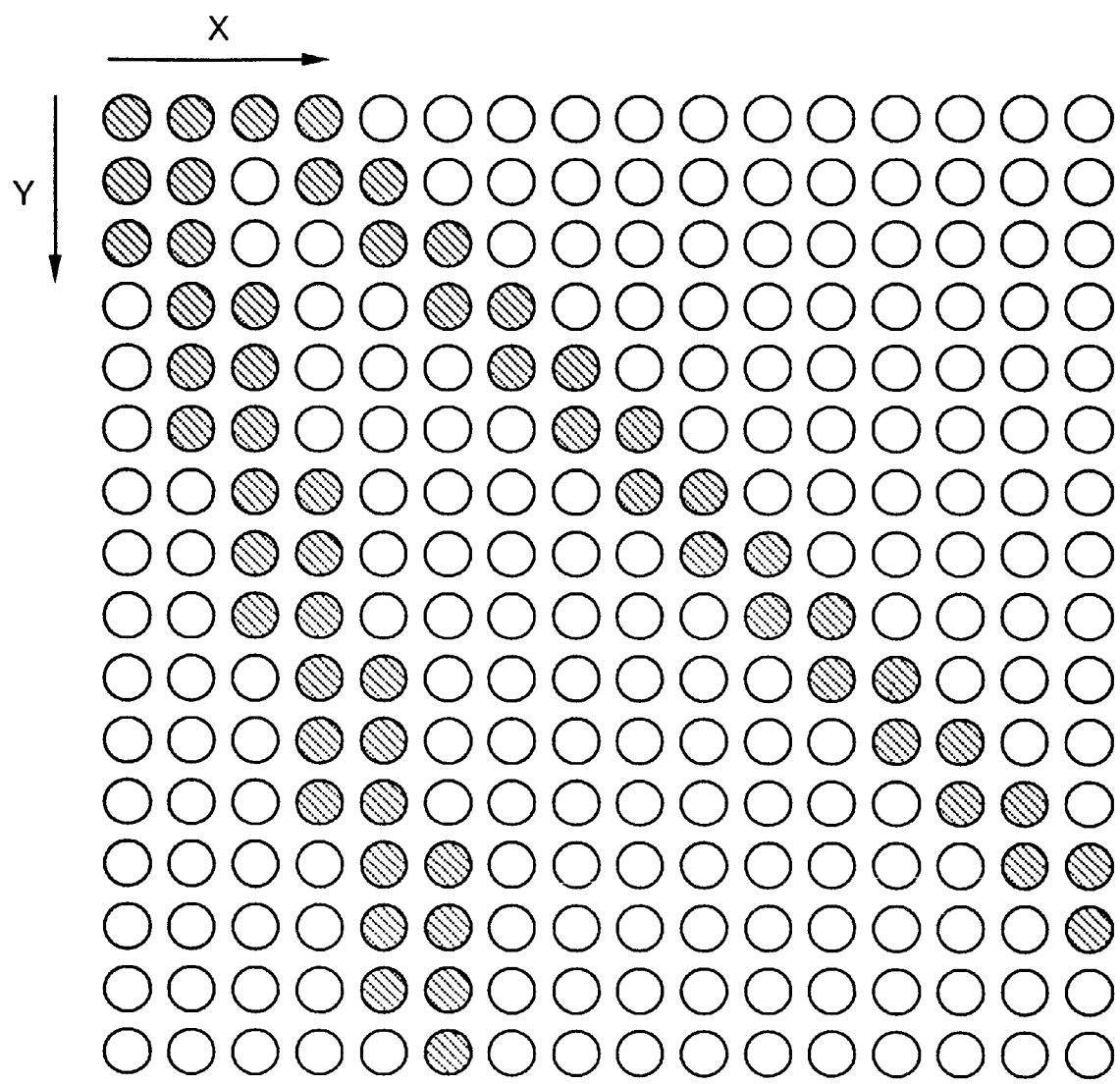
FIG. 1 is a view showing a dot arrangement obtained when an oblique line is drawn.

FIG. 1 is a view showing a typical example in which an outline portion is jaggedly distorted when an oblique line is drawn by a dot matrix printer.

Referring to FIG. 1, a direction indicated by an arrow X is a main scanning direction, and a direction indicated by an arrow Y is a sub-scanning direction. According to FIG. 1, an oblique line having a gradient close to the main scanning direction is drawn as a smooth line. However, an oblique line having a gradient close to the sub-scanning direction is distorted. More specifically, it is found that the appearance of distortion largely depends on the angle of the oblique line. The appearance of distortion is closely related to not only a dot density but also the angle of the oblique line. More specifically, if the oblique line is constituted by dots continuously offset one by one, human eyes do not recognize it as a distortion. However, if dot arrays horizontally or vertically linearly continued are offset from each other by two dots or more, the human eye sensitively recognizes it as a distortion.

The basic concept of smoothing represents that, taking such human visual characteristics into consideration, dots arranged at a higher density are used to interpolate the portion where the dot arrays are offset from each other by two dots or more.

In the apparatus of this embodiment, without changing the dot density, i.e., dot matrix (mesh) density, a dot size is changed by changing the permeability (spreading) of the ink of dots at a portion to be smoothed, or a concentration is changed accordingly, thereby obtaining a smoothing effect. Therefore, in this embodiment, inks with different permeabilities are used.

The apparatus arrangement in this embodiment will be described below in detail with reference to FIGS. 2 and 3.

Figure 2:
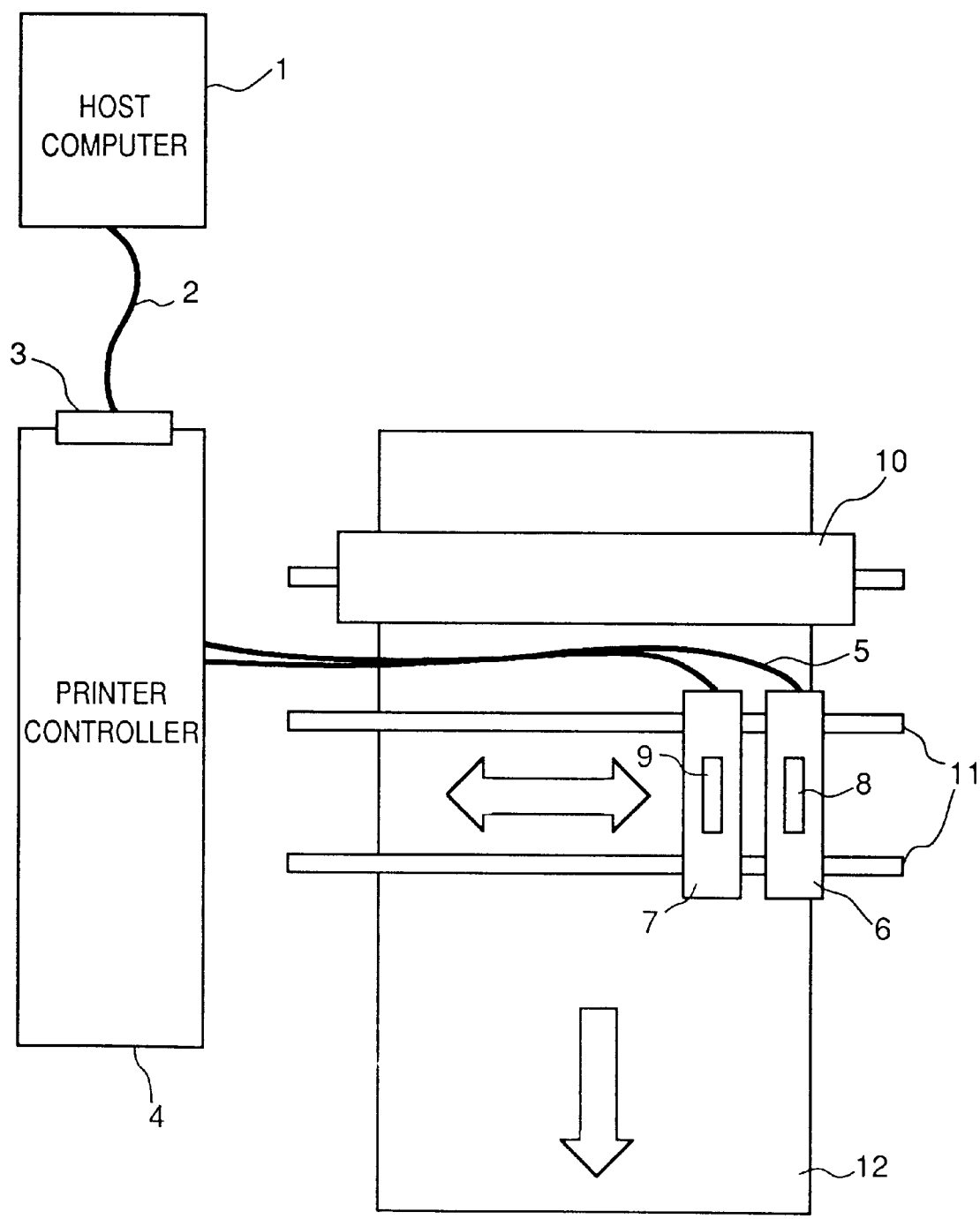
FIG. 2 is a view showing an arrangement of the first embodiment according to the present invention.

FIG. 2 is a view schematically showing the arrangement of a monochrome printer of this embodiment. The arrangement of the printer in FIG. 2 is characterized in that inks having different spreading rates, i.e., permeabilities are simultaneously stored in the printer.

Referring to FIG. 2, reference numeral 1 denotes a host computer; 2, an interface cable; and 3, an interface port of a printer controller 4. The printer controller 4 incorporates a smoothing section (to be described later) and the like. Reference numeral 5 denotes a flexible cable; 6, a recording head A; 7, a recording head B; 8, an ejection nozzle array of the recording head A 6; and 9, an ejection nozzle array of the recording head B 7. Reference numeral 10 denotes a convey roller of a recording medium 12; 11, a carrier guide shaft for moving the recording heads A 6 and B 7 in the main scanning direction indicated by an arrow; and 12, the recording medium.

Figure 3:
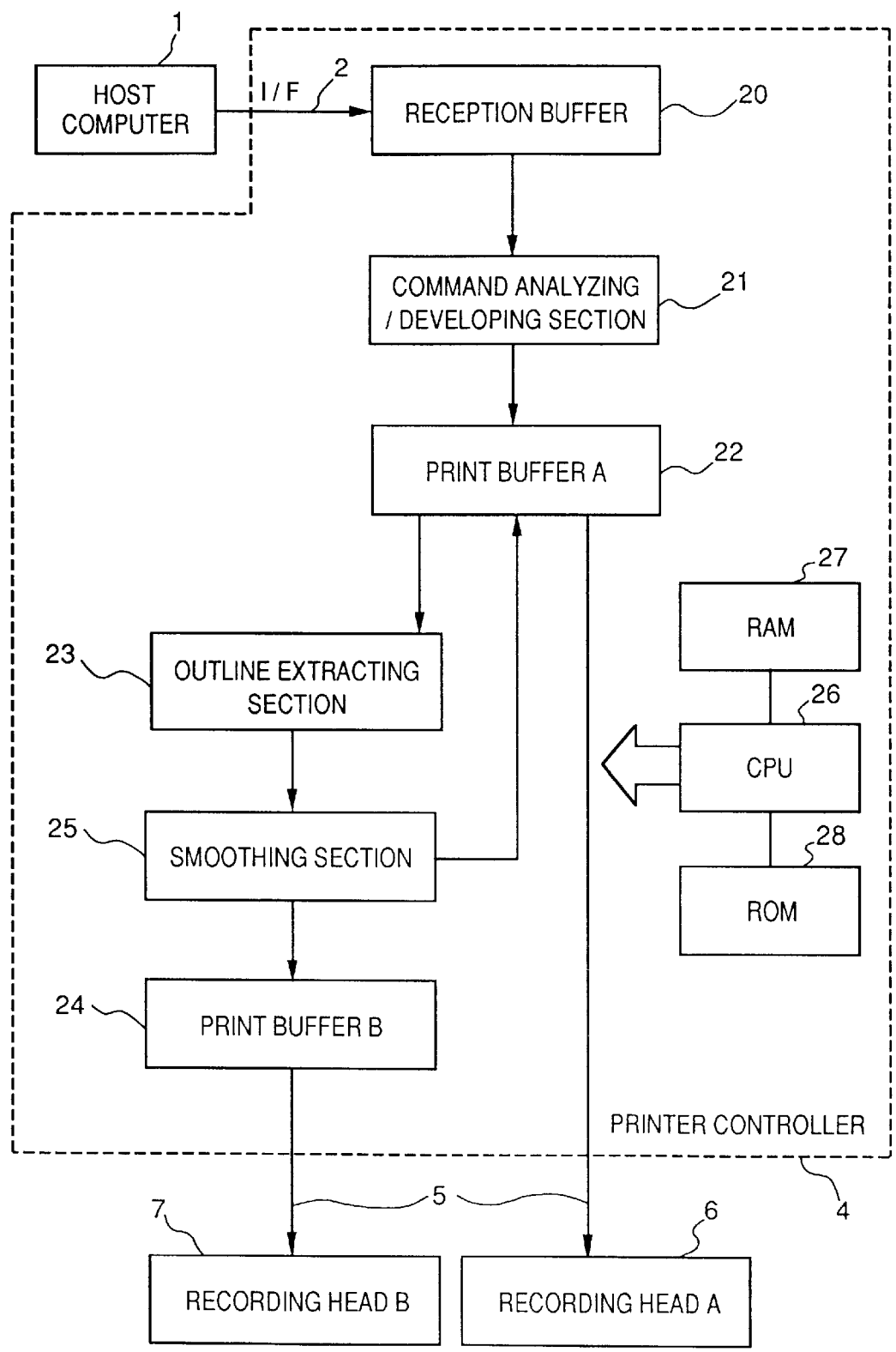
FIG. 3 is a block diagram schematically showing processing of the first embodiment according to the present invention.

FIG. 3 is a block diagram showing part of the detailed arrangement of the printer controller 4 of the apparatus of this embodiment shown in FIG. 2. Print data from the host computer 1 is input to the printer controller 4 through the interface cable 2 and stored in a reception buffer 20. A command is analyzed through a command analyzing/developing section 21. At the same time, the print data is developed and written in a print buffer A 22. The print data developed here is normally sent to the recording head A 6, and printing is executed.

Normally, the command analyzing/developing section 21 performs general smoothing in only the main scanning direction. In this embodiment, however, the command analyzing/developing section 21 does not perform smoothing. The command analyzing/developing section 21 sends the data written in the print buffer A 22 to an outline extracting section 23 to extract outline portion data. The outline portion data extracted by the outline extracting section 23 is sent to a smoothing section 25. Necessary smoothing is performed, and the data is stored in a print buffer B 24.

When a printing operation is to be performed, the data in the print buffer A 22 is normally printed by the recording head A 6. Thereafter, the smoothed data stored in the print buffer B 24 is printed by the recording head B 7. Reference numeral 26 denotes a CPU for controlling each constituent element of the printer controller 4. Reference numeral 27 denotes a RAM serving as a working area of the CPU 26; and 28, a ROM for holding a control program, parameters, and the like.

The printing steps of this embodiment, which include smoothing processing by the smoothing section 25, will be described below in detail with reference to FIGS. 4 to 8, assuming that a circle is to be drawn.

Figure 4:
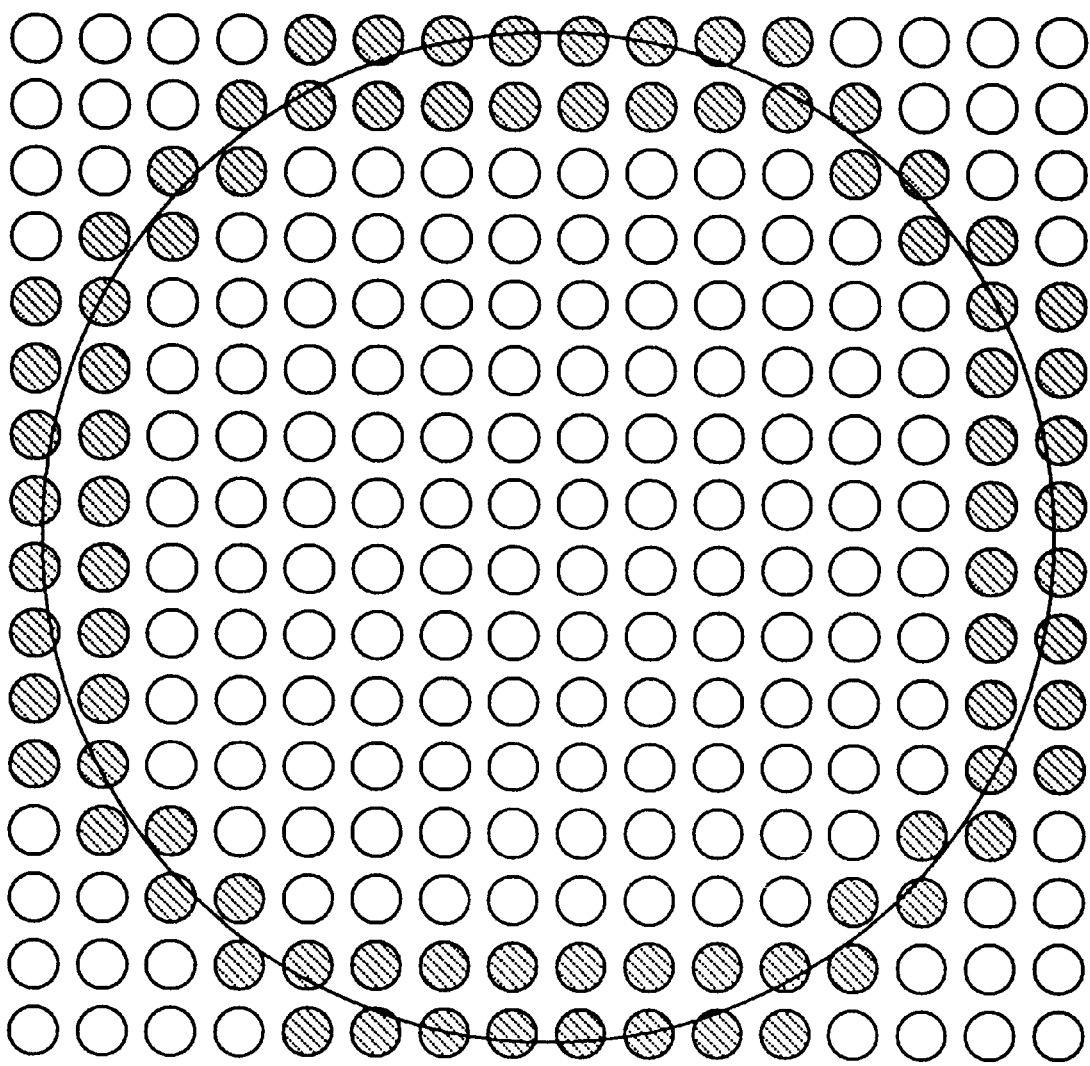
FIG. 4 is a view showing a dot arrangement obtained when a circle is drawn.
Figure 5:
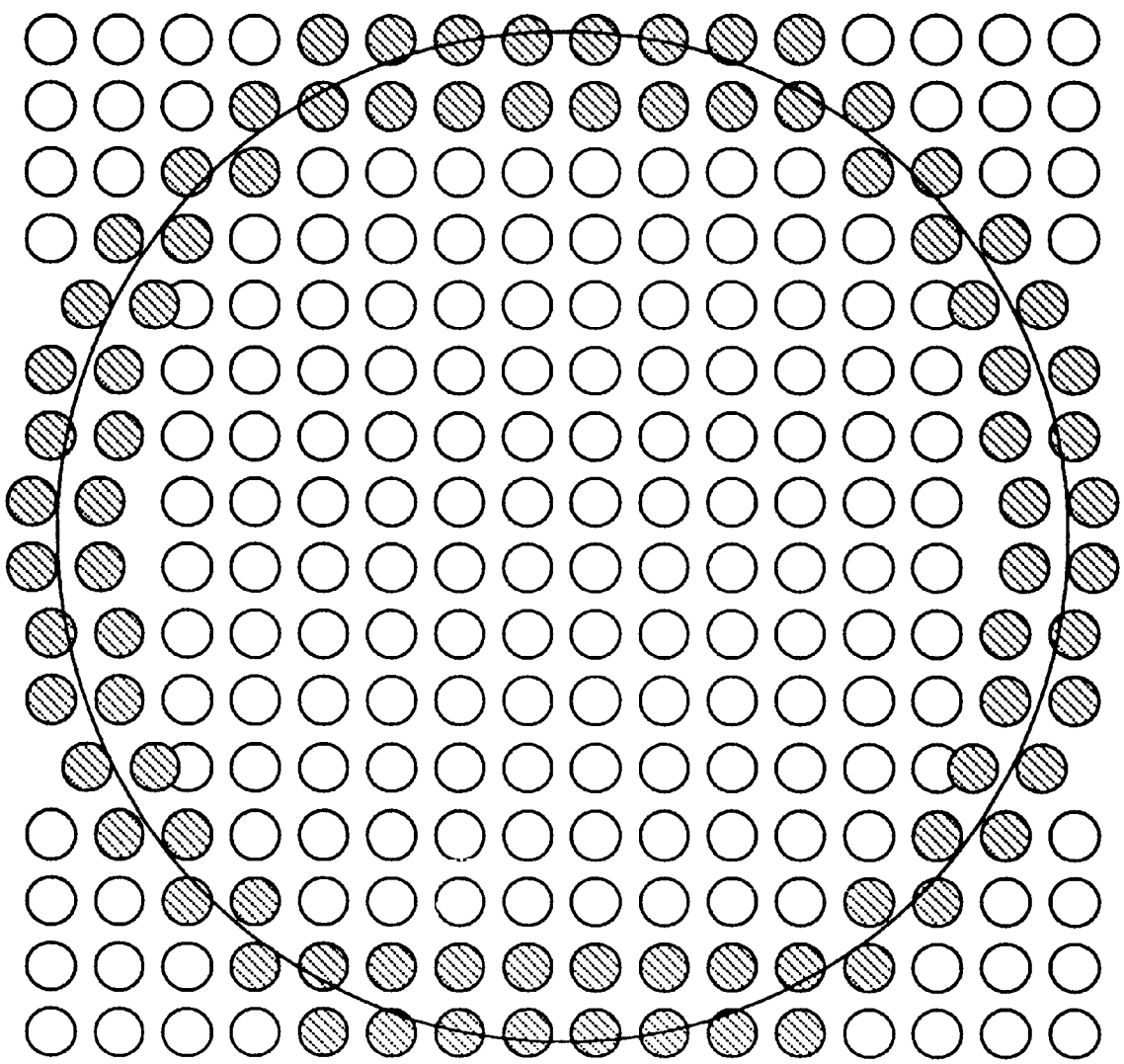
FIG. 5 is a view showing a dot arrangement obtained when a circle is drawn by performing smoothing in only a main scanning direction.
Figure 6:
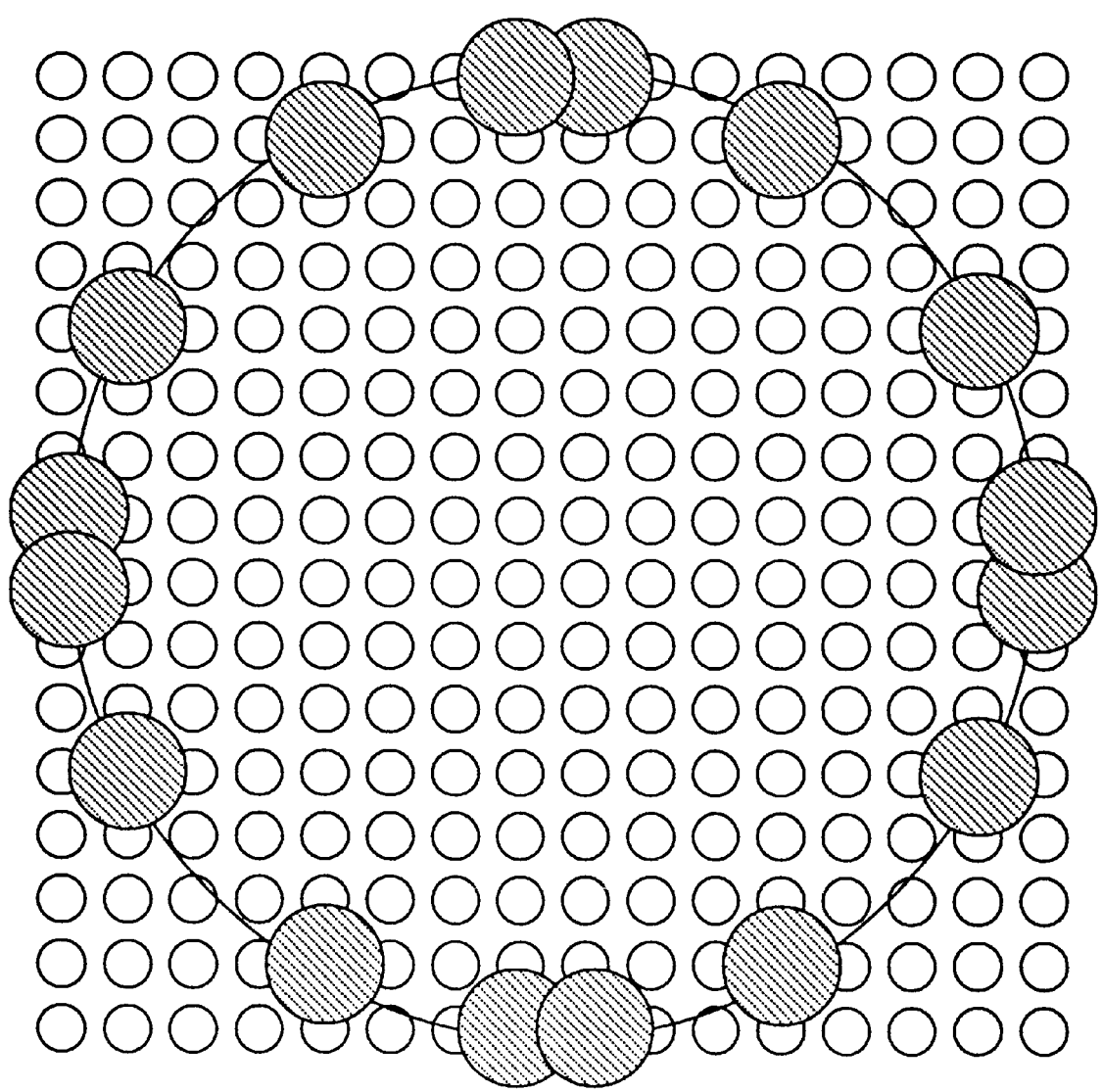
FIG. 6 is a view showing the arrangement of dots having a high permeability, which is obtained when the circle is drawn in the first embodiment according to the present invention.
Figure 7:
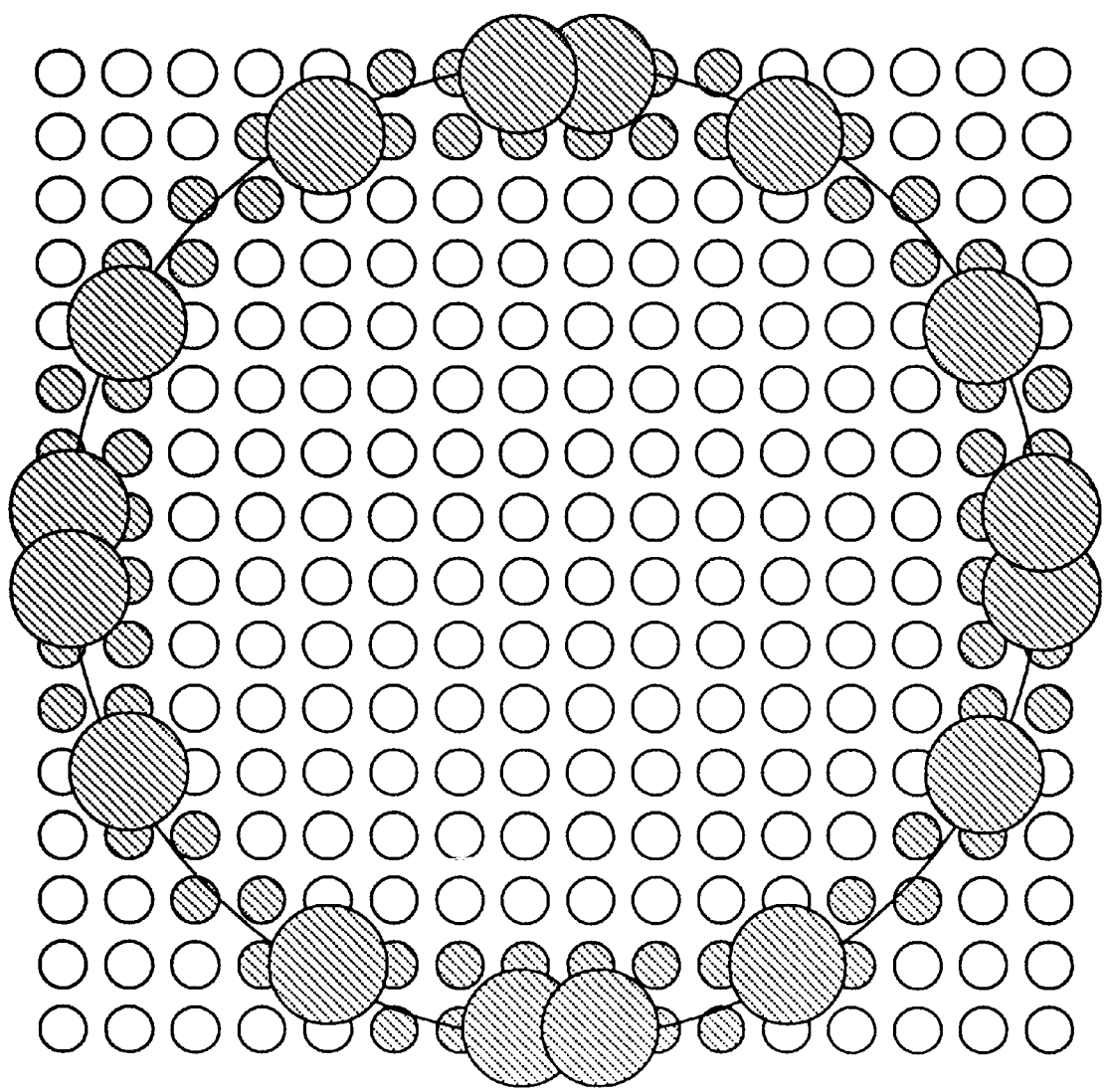
FIG. 7 is a view showing a dot arrangement obtained when the circle is drawn in the first embodiment according to the present invention.

FIG. 4 shows a typical example in which the outline portion is jagged upon using the dot matrix printer. FIG. 5 shows a result of general smoothing performed in only the main scanning direction of the dot matrix printer. FIG. 6 shows the state of the outline portion stored in the print buffer B 24 after smoothing is performed by the smoothing section 25 of this embodiment. FIG. 7 shows the final output state of the outline portion in this embodiment.

With the smoothing processing in only the main scanning direction as shown in FIG. 5, the outline has different shapes in the vertical and horizontal directions, resulting in a distorted circle. In this embodiment, main scanning of the carriage is performed first of all. The dots developed by the command analyzing/developing section 21 and stored in the print buffer A 22 are recorded by the recording head A 6 using an ink with a low permeability as small-sized dots in the dot arrangement shown in FIG. 4. Immediately after this processing, during the same scanning of the carriage, the dots smoothed by the smoothing section 25 and stored in the print buffer B 24 are recorded by the recording head B 7 using an ink with a high permeability as large-sized dots in the dot arrangement shown in FIG. 6. With this processing, the arrangement in FIG. 4 overlaps that in FIG. 6, thereby completing an almost perfect circle shown in FIG. 7.

In the smoothing processing by the smoothing section 25 of this embodiment, dots having a large dot size are determined from the outline portion data extracted by the outline extracting section 23. This smoothing method will be described below with reference to FIG. 13.

An n×n block pattern which has specific determination/process conditions is placed on a print image while offsetting the pixel of interest one by one. When the print image matches with the determination conditions of the block pattern, dots are constituted in accordance with the process conditions, thereby determining dots having a large dot size in this embodiment.

Figure 13:
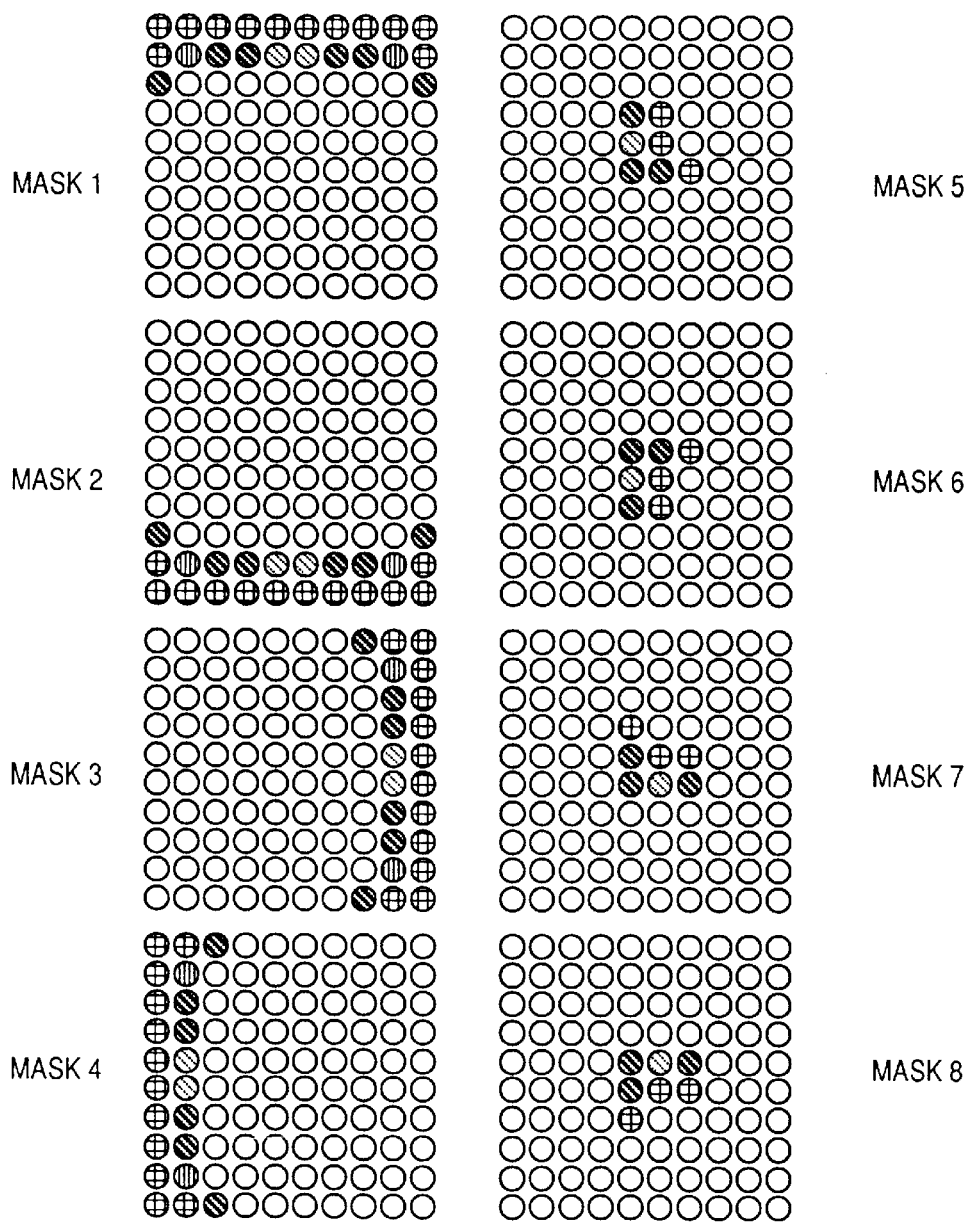
FIG. 13 is a view showing a determination example of smoothing in the first embodiment according to the present invention.

For example, when the circle shown in FIG. 7 is to be drawn, smoothing can be performed using eight 10×10 block patterns shown in FIG. 13.

These block patterns are stored in the ROM 28 in advance.

The determination conditions of the eight block patterns shown in FIG. 13 include "print designation dot", "non-print designation dot", and "non-determination dot" for performing no determination. The process conditions include "print", "non-print", "print after increase in dot size", and "non-process".

In the block pattern shown in mask 1 of FIG. 13, the determination conditions match with the print image in FIG. 4 at the upper central portion. The dots matching with the determination conditions are processed in accordance with the process conditions, thereby determining print dots, non-print dots, and print dots after the increase in the dot size.

As for masks 2 to 8 in FIG. 13, the same processing as in mask 1 is performed. Referring to FIG. 4, clockwise from the upper central portion where the above mask 1 is applied, the determination conditions match with the print image in the order of mask 7, mask 5, mask 3, mask 6, mask 8, mask 2, mask 7, mask 5, mask 4, mask 6, and mask 8. Processing is performed in accordance with the process conditions, thereby completing the print image shown in FIG. 7 after smoothing.

In this manner, the smoothing section 25 determines dots having a large dot size and simultaneously determines dots to be deleted. The information of dots to be deleted is output from the smoothing section 25 to the print buffer A 22, and the corresponding dots are deleted in the print buffer A 22, thereby performing dot deletion.

As the outline extracting method of the outline extracting section 23, a known method can be used, as a matter of course.

Figure 14:
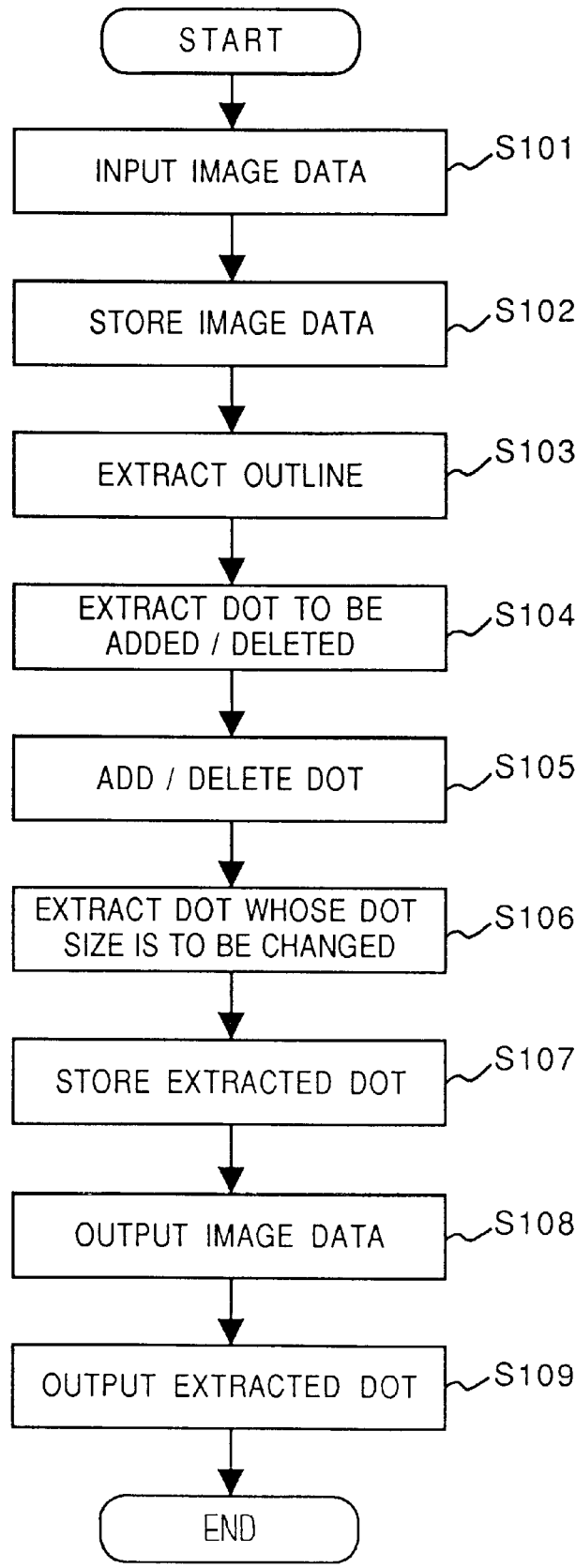
FIG. 14 is a flow chart showing smoothing in the first embodiment.

FIG. 14 is a flow chart of the smoothing processing in this embodiment. In step S101, image data is input from the host computer 1 shown in FIG. 3, and developed by the command analyzing/developing section 21. In step S102, the image data is stored in the print buffer A 22. In step S103, the outline extracting section 23 extracts an outline from the image data in the print buffer A 22 using a known method. In step S104, the smoothing section 25 extracts dots to be added/deleted using the mask patterns in FIG. 13. In step S105, addition/deletion of the dots to/from the image data stored in the print buffer A 22 is executed. Dots whose dot size is to be changed are extracted in step S106 and stored in the print buffer B 24 in step S107. In step S108, the image data stored in the print buffer A 22 is printed by the recording head A 6. In step S109, the dots stored in the print buffer B 24 are printed by the recording head B 7 using an ink with a higher permeability than that of an ink used by the recording head A 6.

In the above description, the same scanning is exemplified. However, this processing may be combined with another print control such as multi-path printing. In this case, control such as a change in ejection amount can be simultaneously performed, thereby performing control to correct a difference between dot sizes, which is caused by a difference between the permeabilities, to an appropriate value.

Figure 8:
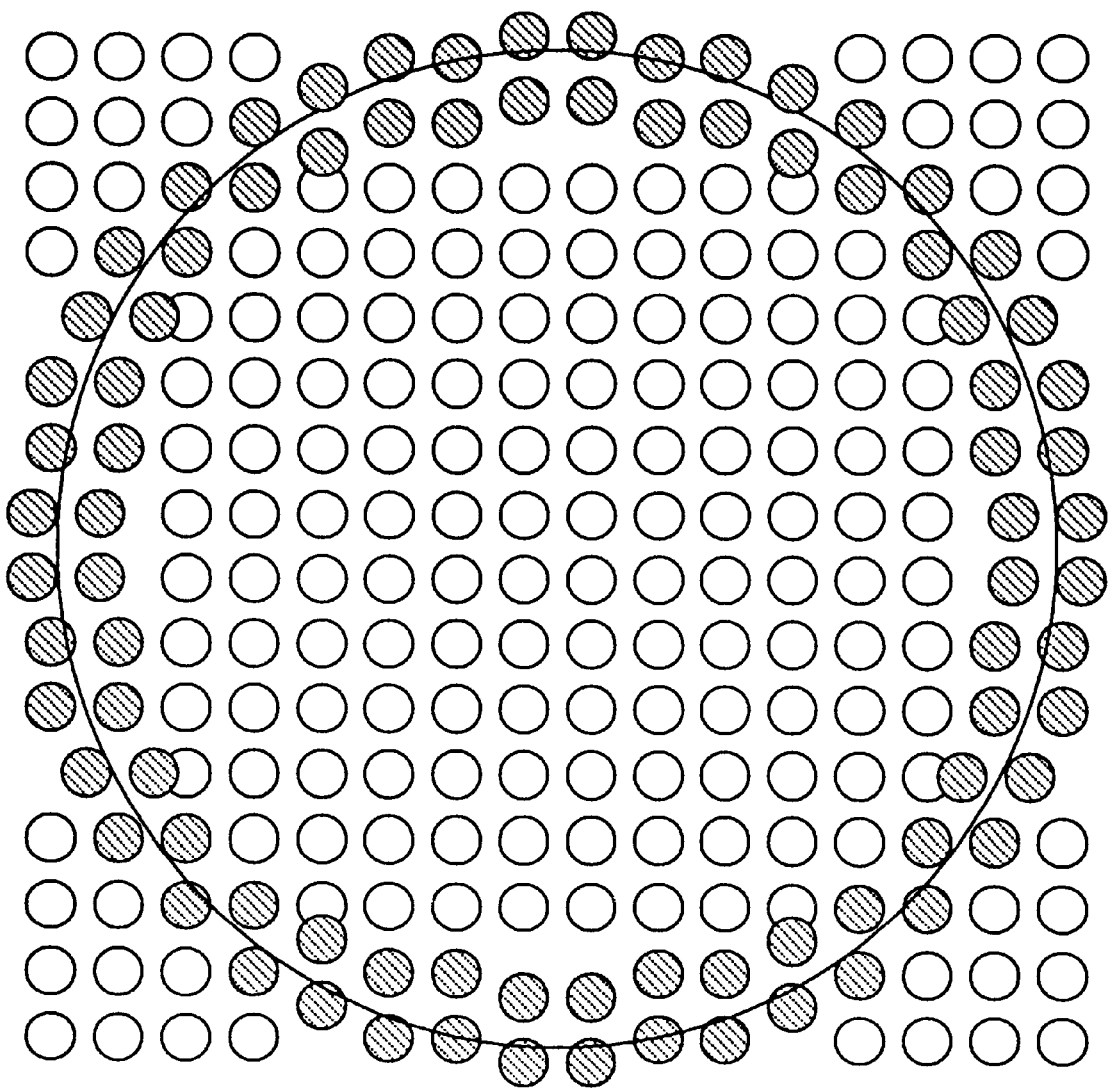
FIG. 8 is a view showing a dot arrangement obtained when a circle is drawn by a high-resolution laser beam printer.

In the above-described smoothing method in this embodiment, the address positions of the dots are kept unchanged at the original dot density. However, when dots with different permeabilities are additionally printed, dots having a larger dot size as shown in FIG. 7 can be generated falsely. In this case, a print result equivalent to an ideal circle as shown in FIG. 8 at a dot density doubled in the vertical and horizontal directions can be obtained.

In each drawing used for the description of this embodiment, for the purpose of easy understanding of the dot arrangement, the dots are illustrated to be separated from each other, so the difference between the dot sizes becomes conspicuous. However, since the dots actually have enough sizes to overlap each other, an almost perfect circle can be drawn without changing the dot density.

Figure 9:
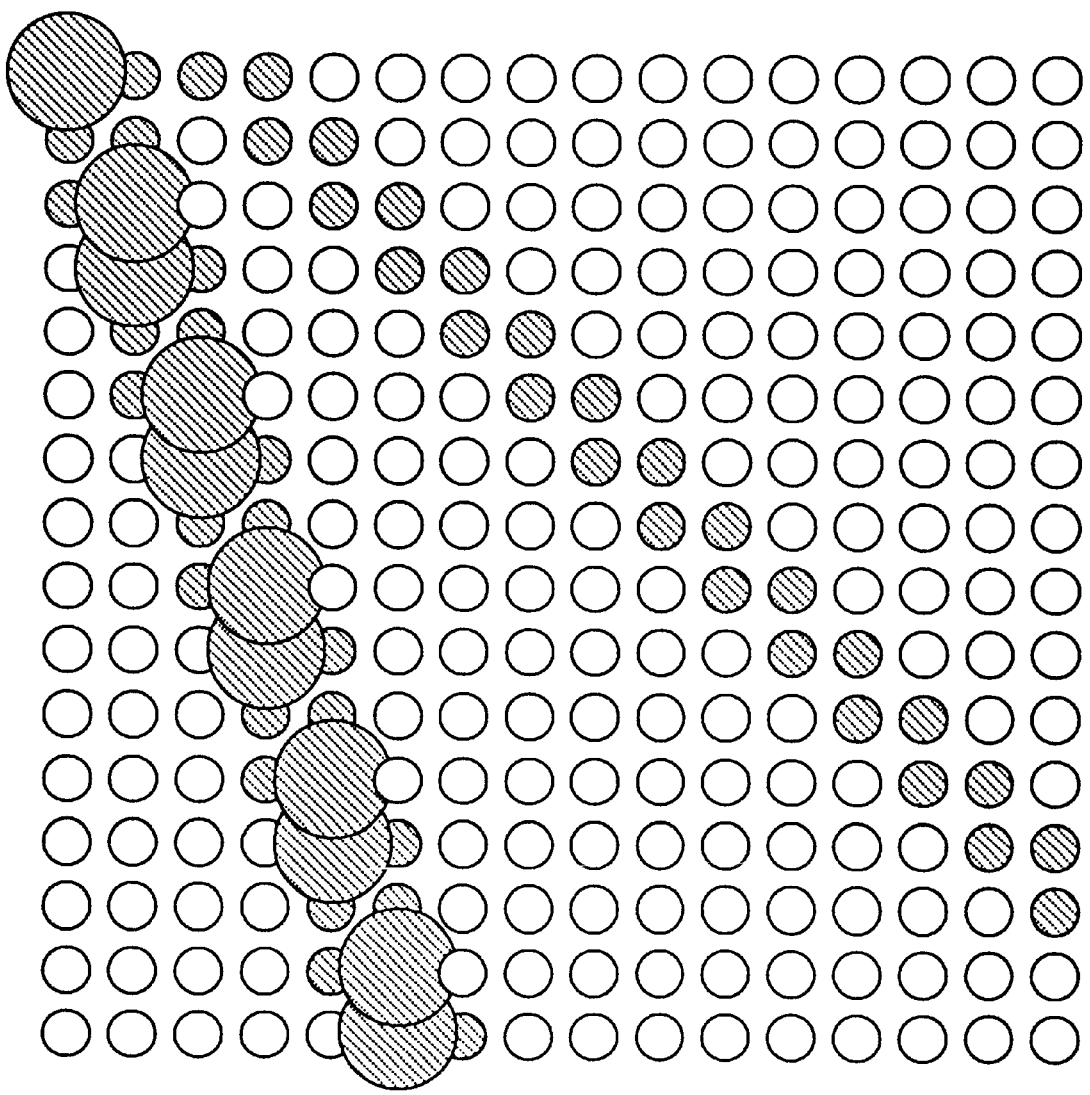
FIG. 9 is a view showing a dot arrangement obtained when an oblique line is drawn in the first embodiment according to the present invention.

As for the distortion of the oblique line shown in FIG. 1 obtained upon using the dot matrix printer, the smoothing processing is performed as described above by applying this embodiment. As a result, the jaggedness becomes inconspicuous, as shown in FIG. 9.

As described above, according to this embodiment, in the image output apparatus of the ink-jet system, the smoothing processing can be sufficiently performed in both the main scanning direction and the sub-scanning direction without adding a high-resolution addressing function and a memory, limiting the direction of an oblique line, and reducing the recording speed.

Figure 10:
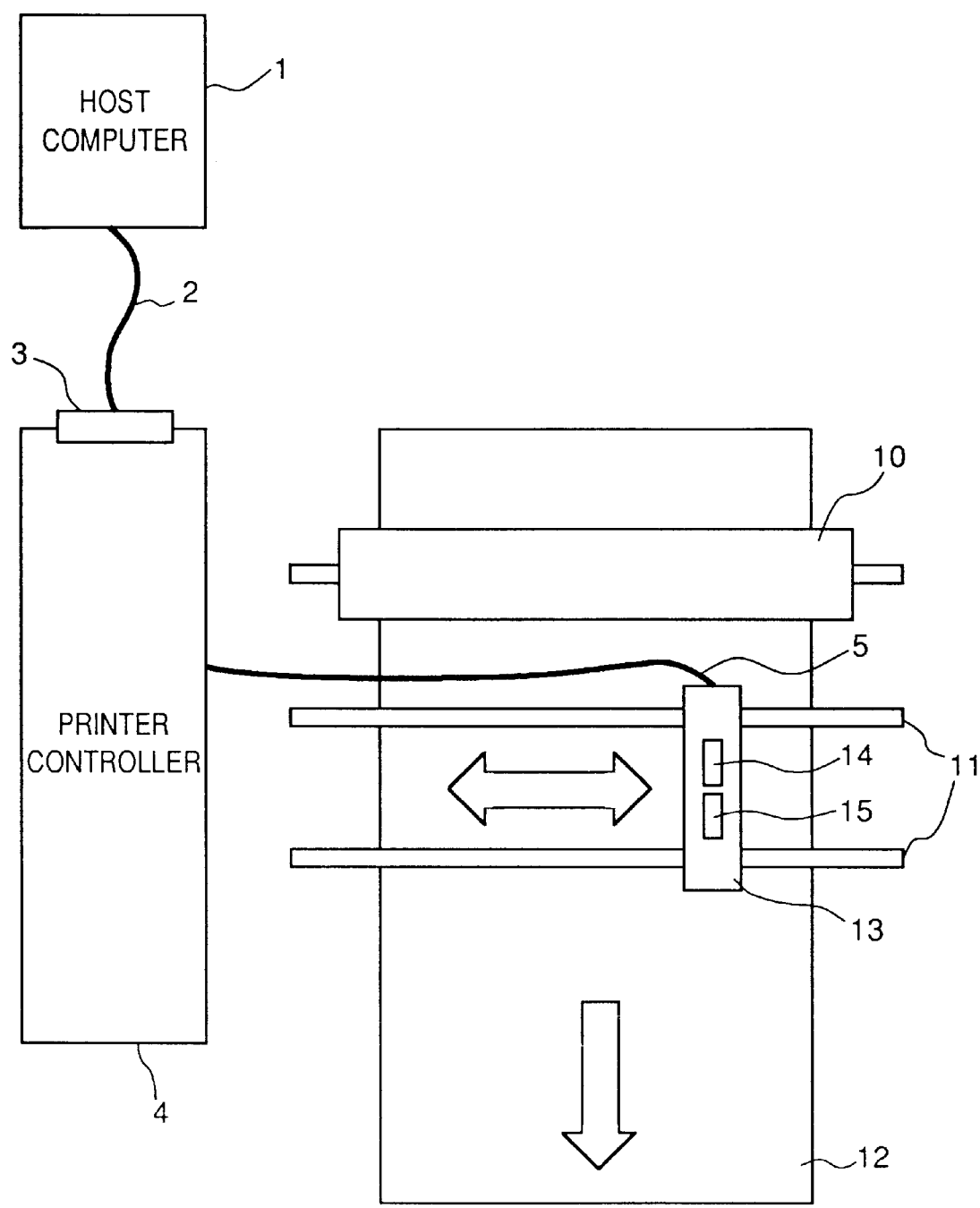
FIG. 10 is a view showing the arrangement of the first and second embodiments according to the present invention.

Referring to FIGS. 2 and 3, the arrangement having the two recording heads A 6 and B 7 has been described. However, as shown in FIG. 10, an arrangement in which two ejection nozzle arrays A 14 and B 15 are vertically arranged in a recording head 13 can also be used to realize this embodiment.

In this embodiment, generation control for dots to be printed after the smoothing processing is performed by the smoothing section 25. However, this embodiment is not limited to this. This control may be performed by hardware or software incorporated in a printer driver or another program of the host computer 1 or in the recording head A or B.

<Second Embodiment>

The second embodiment according to the present invention will be described below.

In the first embodiment, overlap recording is performed using two inks having different permeabilities. To the contrary, in the second embodiment, the dots of the two inks do not overlap each other. In addition, by using recording heads which are vertically arranged to operate at different recording timings, diffusion of the inks can be prevented.

The apparatus arrangement in the second embodiment is the same as that in FIG. 2 shown in the first embodiment, and a detailed description thereof will be omitted.

The operation of the second embodiment will be described with reference to a block diagram shown in FIG. 11. The same reference numerals as in FIG. 3 shown in the first embodiment denote the same elements in FIG. 11, and a detailed description thereof will be omitted.

Figure 11:
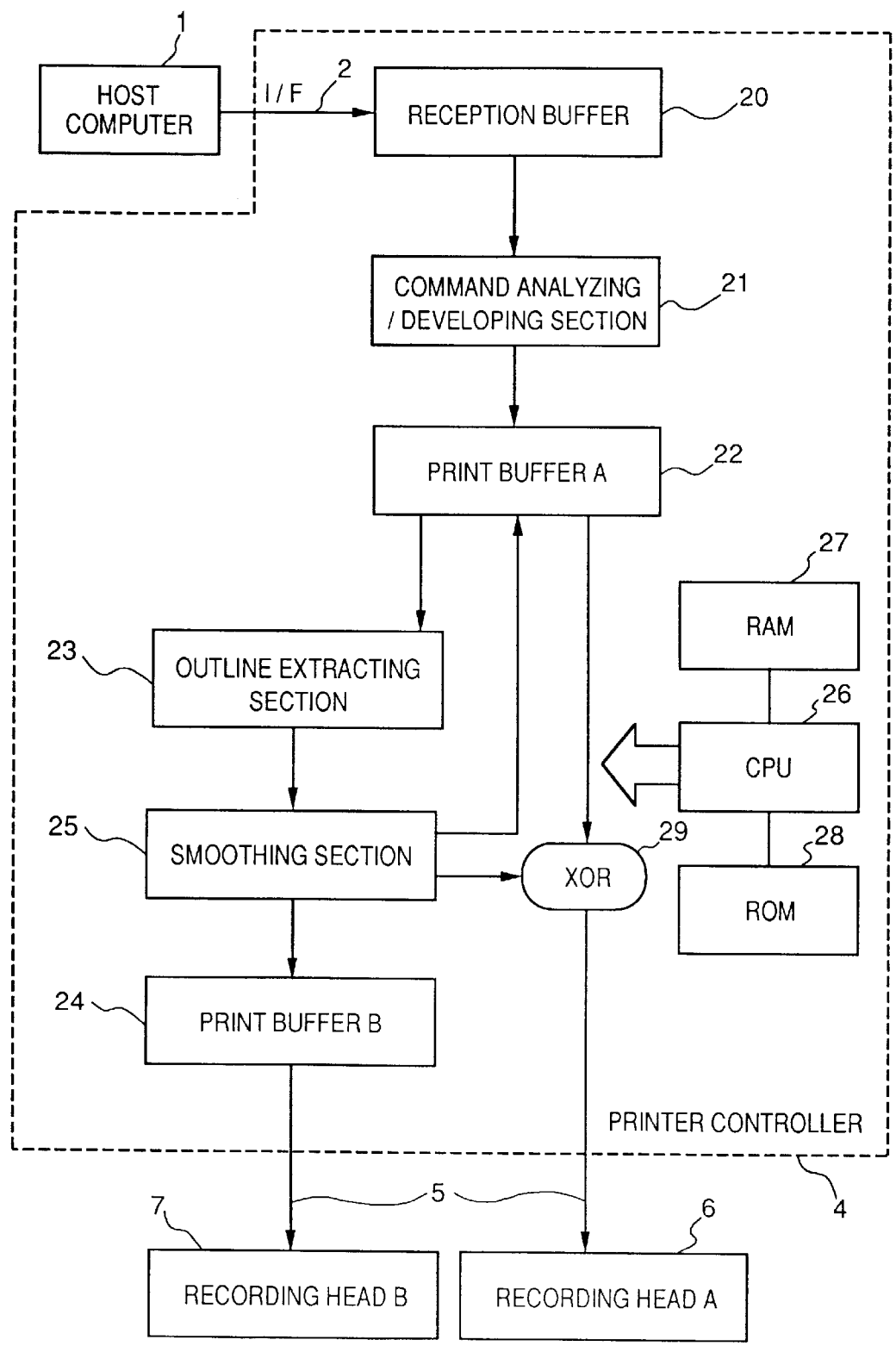
FIG. 11 is a block diagram schematically showing processing of the second embodiment according to the present invention.

Referring to FIG. 11, as in the arrangement shown in FIG. 3, image data is stored in a print buffer A 22 and output to an exclusive-OR (XOR) section 29. From the data stored in the print buffer A 22, data to be smoothed by a smoothing section 25 is determined on the basis of outline portion data extracted by an outline extracting section 23 and output to the XOR section 29. The data from the print buffer A 22 is XORed with the data from the smoothing section 25 by the XOR section 29. The data XORed by the XOR section 29 is recorded by a recording head A 6. As in the first embodiment, a target smoothing portion stored in a print buffer B 24 is output by a recording head B 7.

Figure 15:
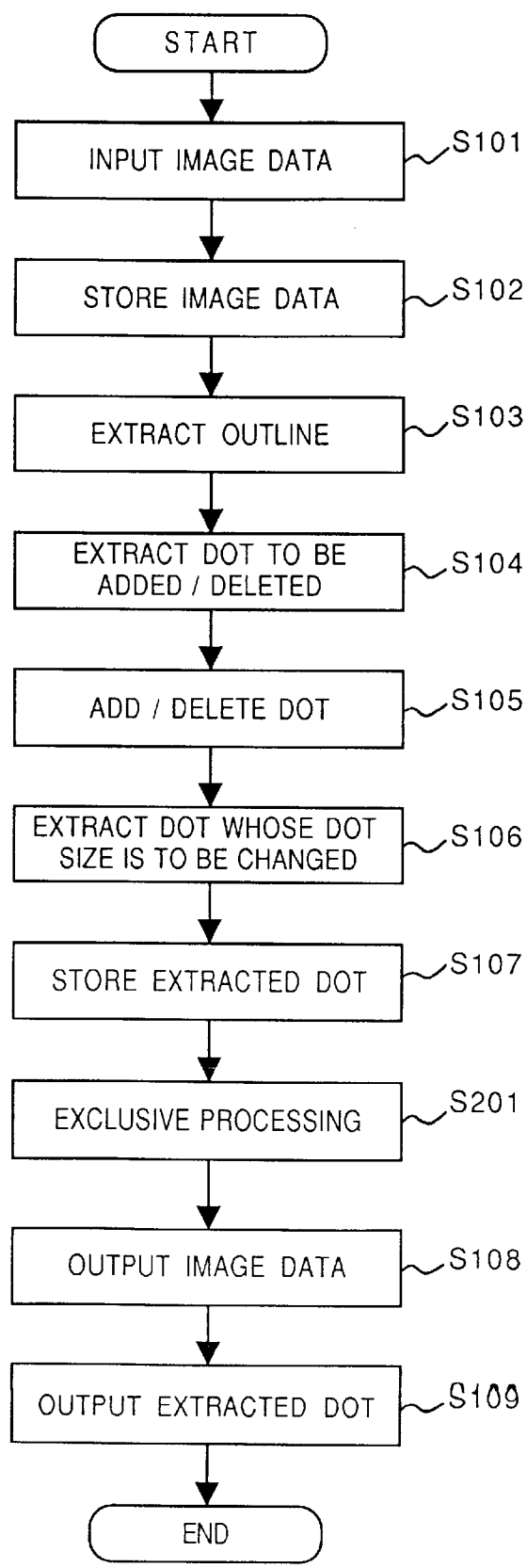
FIG. 15 is a flow chart showing smoothing in the second embodiment.

FIG. 15 is a flow chart of the smoothing processing in the second embodiment. FIG. 15 is characterized by exclusive processing shown in step S201. The remaining processing is the same as that in FIG. 14 in the first embodiment. The same step numbers as in FIG. 14 denote the same processing in FIG. 15, and a detailed description thereof will be omitted.

As described above, in the second embodiment, a printer controller 4 has an arrangement as shown FIG. 11. The exclusive-OR (XOR) processing is performed for the output data of the two recording heads, thereby eliminating a portion where the two inks are overlap-recorded.

Assume that an ink with a high permeability and an ink with a low permeability do not overlap each other on a paper sheet but are adjacent to each other. In this case, the ink with the low permeability is printed in advance. While this ink does not completely permeate and is floating on the paper sheet, the dot of the ink with the high permeability is subsequently printed to be adjacent and in contact with the previously printed dot. At this time, the ink with the low permeability, which does not completely permeate, starts to diffuse.

If the printing concentration of the dots of the ink with the high permeability at the target smoothing portion is to be set to low, the dots of the ink with the high permeability can be undesirably mixed with the adjacent dots of the ink with the low permeability and averaged. In this case, the following arrangement can be effectively used.

An example in which the print control of the second embodiment is applied to the recording apparatus having vertically arranged nozzles, as shown in FIG. 10 of the first embodiment, will be described below.

When the nozzles are vertically arranged as in FIG. 10, control is performed such that during one main scanning cycle of the carriage, the ink with the low permeability is printed by an ejection nozzle array 14, and the ink with the high permeability is printed by an ejection nozzle array 15. The position of each nozzle on a recording head 13 is adjusted such that a print image is completed upon actually performing paper feeding and overlap printing. With this process, after the ink with the low permeability permeates, the ink with the high permeability sticks. For this reason, the dots of the ink with the high permeability are not mixed with the adjacent dots of the ink with the low permeability to be averaged while the two inks are printed.

In the vertically arranged nozzles as shown in FIG. 10, inks of different types are not printed on the same portion during one scanning cycle. An ink of a different type is printed at least with a time lag corresponding to one scanning cycle. Therefore, in a printing operation using inks having different properties, especially when mixture of the inks results in inconvenience, this method can be effectively used.

In the second embodiment, an example has been described in which the printing operation is performed using the two inks with different permeabilities. However, the present invention is not limited to these two inks. This method can be effectively used also when a plurality of inks, i.e., three or more ink, are used because the smoothing rate can be changed.

As described above, according to the second embodiment, when the smoothing processing of the first embodiment is to be performed, the ink with the low permeability is prevented from being ejected on a portion where the ink with the high permeability is ejected during one scanning cycle. Since the inks do not overlap each other, the amount of ink to be used can be reduced. At the same time, feathering or unnecessary permeation caused by overejection of the ink can be prevented. Diffusion of inks between the adjacent dots can also be prevented.

<Third Embodiment>

In the first and second embodiments, an example has been described in which the dot size is changed by using inks having the same color and different permeabilities. However, the present invention is not limited to the above example. When inks of different colors are used in place of the inks having the different permeabilities in the first and second embodiments, an effect for changing the dot size can be obtained. The third embodiment according to the present invention will be described below.

The third embodiment in which black dots are printed while dots at a target smoothing portion are printed by color inks having different permeabilities and a recording apparatus having horizontally arranged recording heads will be described below. As for the remaining colors, smoothing is not performed in this embodiment. However, smoothing may be performed.

Figure 12:
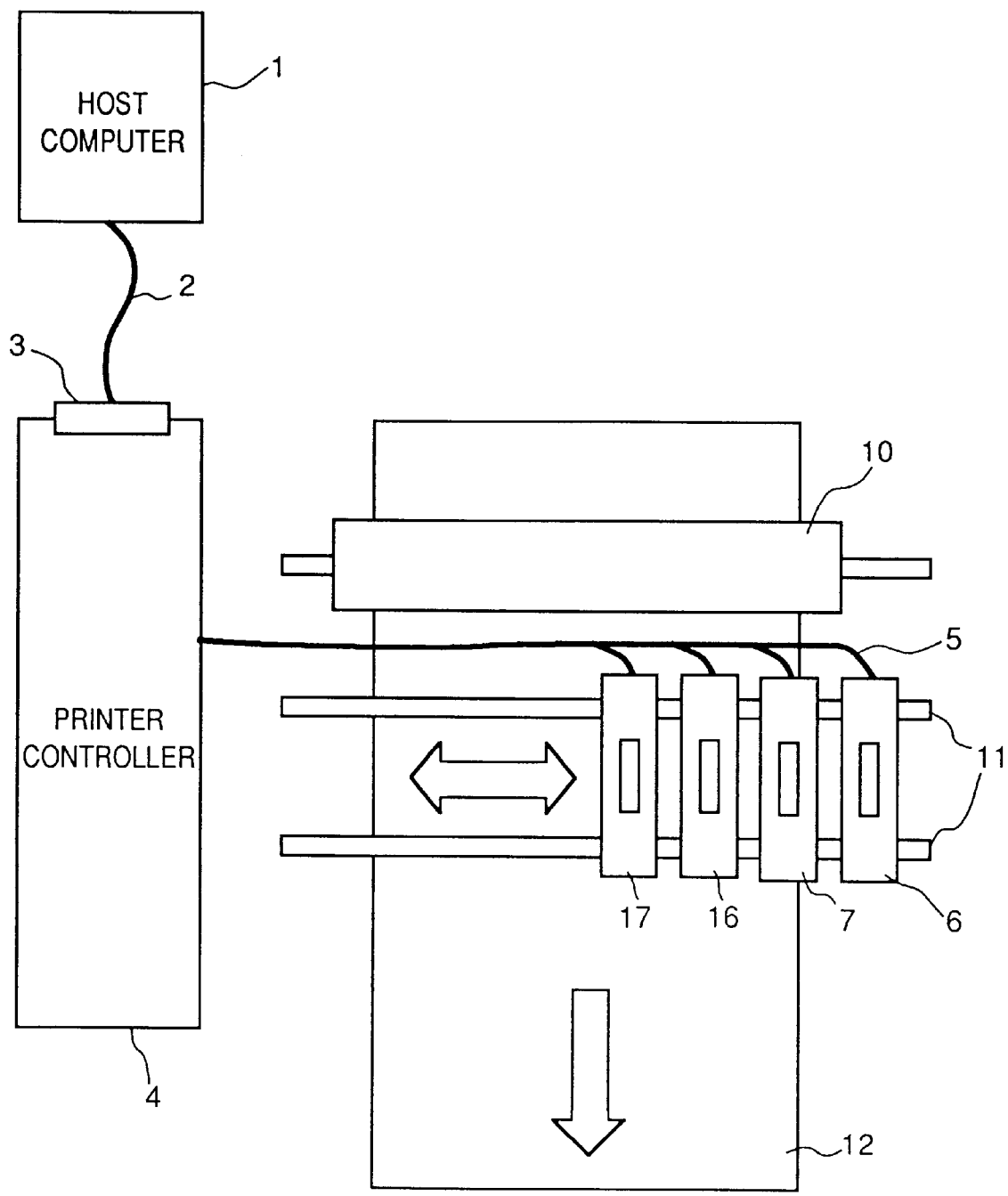
FIG. 12 is a view showing the arrangement of the third embodiment according to the present invention.

FIG. 12 is a view showing the apparatus arrangement in the third embodiment.

The same reference numerals as in FIG. 1 denote the same elements in FIG. 12, and a detailed description thereof will be omitted. Referring to FIG. 12, reference numerals 6, 7, 16, and 17 denote recording heads A, B, C, and D, respectively. In the third embodiment, it is assumed that a black ink is stored in the recording head A 6, a yellow ink is stored in the recording head B 7, a cyan ink is stored in the recording head C 16, and a magenta ink is stored in the recording head D 17.

First of all, dots of a black ink with a low permeability are printed using the recording head A 6. Dots of the color inks are printed on the target smoothing portion (overlap-print dots determined by the smoothing processing) using the recording heads B 7, C 16, and D 17. More specifically, for example, magenta dots can be overlap-printed on the dots at the target smoothing portion by the recording head D 17. The magenta ink printed on the black dots which are immediately previously printed is mixed with the black ink, and the permeability is increased in accordance with the permeability characteristics of the color ink, thereby achieving the smoothing processing.

To determine an ink to be used for printing, it is effective to consider uniformization of the consumption amounts of the inks. If some adjacent dots are present at the target smoothing portion, the YMC dots may be printed to be adjacent to each other, thereby obtaining black appearance of the mixed color as a whole. The third embodiment is particularly effectively applied to the arrangement in which the recording heads are horizontally arranged as in FIG. 12. If the recording heads are vertically arranged, the previously printed dots are not easily mixed with the subsequently printed dots, as described in the second embodiment. For this reason, a single color ink can be printed at the target smoothing portion.

Assume that a color ink dot is printed to be adjacent to a black ink dot. In this case, if the black ink dot is separated from the color ink dot by a distance corresponding to only one or two dots, the color ink dot is not easily recognized as a color dot. However, if the black pixel area is a thin line, i.e., very small, the color ink is likely to be recognized. Therefore, the horizontally arranged recording heads as in FIG. 12 are appropriately used in the third embodiment.

In printing using color inks, contrast with respect to the recording medium is decreased as compared to the black ink. For this reason, the same effect as that obtained when a gray ink is printed at the outline portion can be obtained, so the color inks can be very effectively used for smoothing. A black ink having a different concentration may also be used in place of the color inks, as a matter of course.

As described above, according to the third embodiment, by using inks of different colors, smoothing can be effectively performed as in the first and second embodiments. If the image output apparatus has the form of a normal color printer, the third embodiment can be easily realized.

<Fourth Embodiment>

In the first to third embodiments, as a method of obtaining a smooth edge, a method of ejecting inks having different permeabilities with respect to a recording medium to target smoothing dots has been described. According to the concept of the present invention, when an ink with the same permeability is simply ejected at almost the same portion a plurality of times, or the dot size of a target smoothing dot at an outline portion is increased by dot size modulation, smoothing can also be performed. Assume that a black character is to be smoothed as a detailed means.

In the first method, the ejection amount of an ink is modulated such that the dot size of a dot designated as a target smoothing portion is increased during one recording scanning cycle or divided recording scanning. As for the modulation system of recording dots in the ink-jet system, various proposals have already been made and put in use.

In a bubble ink-jet system, basically, Pulse Width Modulation (PWM) is performed for a driving pulse consisting of a plurality of pulses, thereby modulating the ejection amount. If the modulation width (range) is short, a method may be used in which the temperature of the recording head is adjusted, or recording scanning is divided into a plurality of scanning intervals to increase the ejection amount to some extent, and thereafter the PWM is performed. In a piezo system or the like, a method is mainly used in which the piezo modulation width is changed by a voltage.

In conventional smoothing by dot size modulation, the dot size at the target smoothing portion is relatively reduced. To the contrary, in the present invention, the dot size is relatively increased to spread, thereby obtaining the smoothing effect. That is, in the present invention, the resolution (dot density) at the target smoothing portion is the same as that at the remaining portion in both the main scanning direction and the sub-scanning direction.

In the second method, inks having the same composition are overprinted a plurality of times, thereby increasing the dot size without modulation. If an ink having a lower permeability with respect to a recording medium is used, printing can be performed in a short time interval of a plurality of printing scanning operations. In this case, the ink often largely spreads on the recording medium, resulting in convenience. In this sense, this method is more preferable for an ink for high-quality black characters.

In the third method, when overprinting is to be performed a plurality of times to relatively increase the size of target smoothing dots, no inks of the same color but inks of different colors are overprinted. Also in overprinting of the inks of the different colors, the basic concept of the printing sequence is unchanged. A different point is as follows. Since the inks of the different colors are used, if a cyan ink is overprinted on a black ink, the printing density is slightly locally decreased at that portion as compared to overprinting of the black ink. However, even if the density is slightly locally decreased, no practical problem is posed.

When the inks of the different colors are used, two merits can be obtained. One of them is memory saving. The main object of the present invention is to obtain a smoothing effect equivalent to that obtained when the resolution is falsely increased in the main scanning and sub-scanning directions without changing the resolution (dot density) at the time of recording of the printer. In this embodiment, smoothing of a black character is performed using color heads. For this reason, this method need not a dedicated memory having a memory capacity twice or four-times that of a conventional memory, unlike a method in which the resolution of a black character is increased by using an ink of the same color or overprinting. More specifically, target smoothing dots are extracted, and dots to be overprinted are determined. Thereafter, the data of these dots can be ORed with data in the print buffer memory of color dots, which is originally provided for printing. Therefore, the smoothing effect can be obtained without increasing the memory at all.

Assume that a smoothing effect corresponding to a resolution of 720×720 DPI, which is the effect of this embodiment, is obtained by a printer having a resolution of 360×360 DPI and a memory of about 4 MB. In this case, if an ink of the same color is overprinted, the required memory capacity is doubled. In a conventional smoothing method such as an intermesh method using an address space of 720×720 DPI, a four-times memory of 16 MB is necessary.

The other merit is an improvement in recording speed. If an ink of the same color is used, overprinting must be performed a plurality of times except for a case wherein dot size modulation can be performed for each dot. In this case, the throughput decreases to ½ or less in correspondence with the plurality of times of overprinting. However, if inks of different colors are used, printing can be advantageously performed without a decrease in throughput because no ink of the same color is overprinted.

<Fifth Embodiment>

In the first to fourth embodiments, methods of realizing smoothing without increasing the resolution in the main scanning direction of the carriage have been described. However, the first to fourth embodiments can also be applied when the resolution in the main scanning and sub-scanning directions is increased to twice or more, as a matter of course. In the fifth embodiment, smoothing which is performed by increasing the resolution to twice or more will be described.

The apparatus arrangement in the fifth embodiment is the same as that in the first or second embodiment, and a detailed description thereof will be omitted.

In the fifth embodiment, a difference between the permeabilities of inks is slightly reduced as compared to that in the above embodiments. In this case, control can be performed as if the resolution is increased to almost four times or more. Therefore, a better smoothing processing can be performed, i.e., a smoother curve can be drawn.

In the fifth embodiment, dot size modulation which is a combination of known ejection amount modulation and overprinting techniques is further combined with the smoothing processing in the first to fourth embodiments, thereby obtaining an effect equivalent to that obtained upon substantially increasing the resolution.

When two or more inks having different permeabilities are used, the same effect as that obtained upon increasing the resolution to twice or more can also be obtained.

In the above first to third embodiments, inks having different permeabilities are used. Additionally, ejection amount modulation described in the fourth embodiment may be performed. Since a dot size can be changed within a wider range, the resolution can be increased.

As described above, also in the fifth embodiment, smoothing can be performed at a higher resolution.

The relationship among an ejection amount, a permeability, and a dot size, which is used to increase the dot size in the above embodiments, will be described below.

Normally, the dot size tends to increase in proportion to the cubic root of the amount of ink printed on a plain paper sheet. Assume that, when the ink amount is 80 pl, the measured value of the dot size is 107 $\mu$m. In this case, a permeability with respect to the plain paper sheet is calculated without changing the unit system, thereby obtaining a proportional coefficient of 24.8. If the same ink and the same recording medium are used, a dot size of 85 $\mu$m is obtained in an ink amount of 40 pl, and a dot size of 135 $\mu$m is obtained in an ink amount of 160 pl. These dot sizes are obtained when the ink is simultaneously overprinted by ejection amount modulation or overprinted for a short period of time.

In printing using an ink having a higher permeability, the permeability corresponds to the proportional coefficient. If a dot size of 107 $\mu$m is obtained in an ink amount of 24 pl, calculation can be performed using a proportional coefficient of 37.2. In this case, a dot size of 127 $\mu$m is obtained in an ink amount of 40 pl, a dot size of 160 $\mu$m is obtained in an ink amount of 80 pl, and a dot size of 202 $\mu$m is obtained in an ink amount of 160 pl.

If the same ink is overprinted, or an ejection amount is changed by ejection amount modulation, a dot size is calculated in the above manner. Assume that inks having different permeabilities are overprinted. In overprinting for a short period of time, the permeability tends to be close to the higher permeability. Assume that an ink having a low permeability is printed in an amount of 80 pl, and an ink having a higher permeability is immediately overprinted in an amount of 40 pl. The total ink amount is 120 pl. When a dot size is calculated using a proportional coefficient of 37.2 which is the proportional coefficient of the ink having the higher permeability, a dot size of 183 $\mu$m is obtained.

In the conventional smoothing, if the resolution is 360 DPI, normally, smoothing dots having the same size or a smaller size are arranged at the address positions (intermesh) at a resolution of 720 DPI. If dots having the same size are arranged, each dot spreads by 35 $\mu$m which corresponds to ½ pitch between the dots because the pitch between the dots is 70.5 $\mu$m at a resolution of 360 DPI. If the resolution or the degree of modulation is further increased, a value according to the increase is simply obtained.

Also in the present invention which does not use the intermesh method, a system having the same design as that including an address function of 720 DPI can be realized as far as the radius is increased by 35 $\mu$m. The difference between diameters is given as 183−107=76, and a system having a design for increasing the radius by 38 $\mu$m can be realized. Actually, printing is performed a plurality of times, and the permeability is not completely maintained because two inks are mixed with each other. For this reason, the dot size becomes slightly smaller than that obtained by the above calculation. However, such a system can be sufficiently designed.

Figure 16:
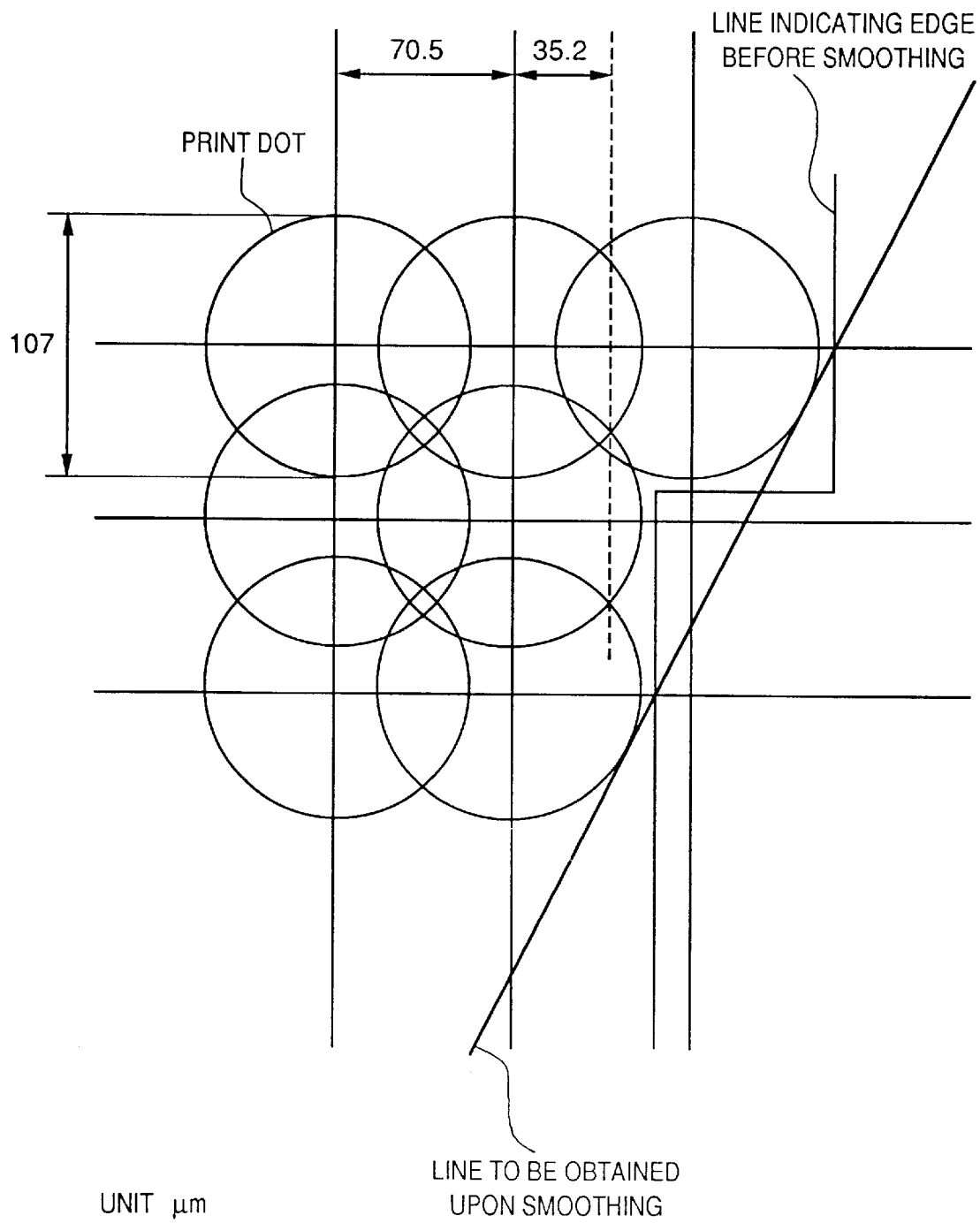
FIG. 16 is a conventional view showing a dot arrangement having a corner to be smoothed in the fourth embodiment.

FIG. 16 is a view showing a dot arrangement before smoothing, which has a corner to be smoothed. As for the dot relationship, an image is formed using only relatively smaller dots having a dot size of 107 $\mu$m. FIG. 16 shows a state wherein an edge to be smoothed is present on the right side of the image before smoothing. A line to be obtained by smoothing is simultaneously shown.

Figure 17:
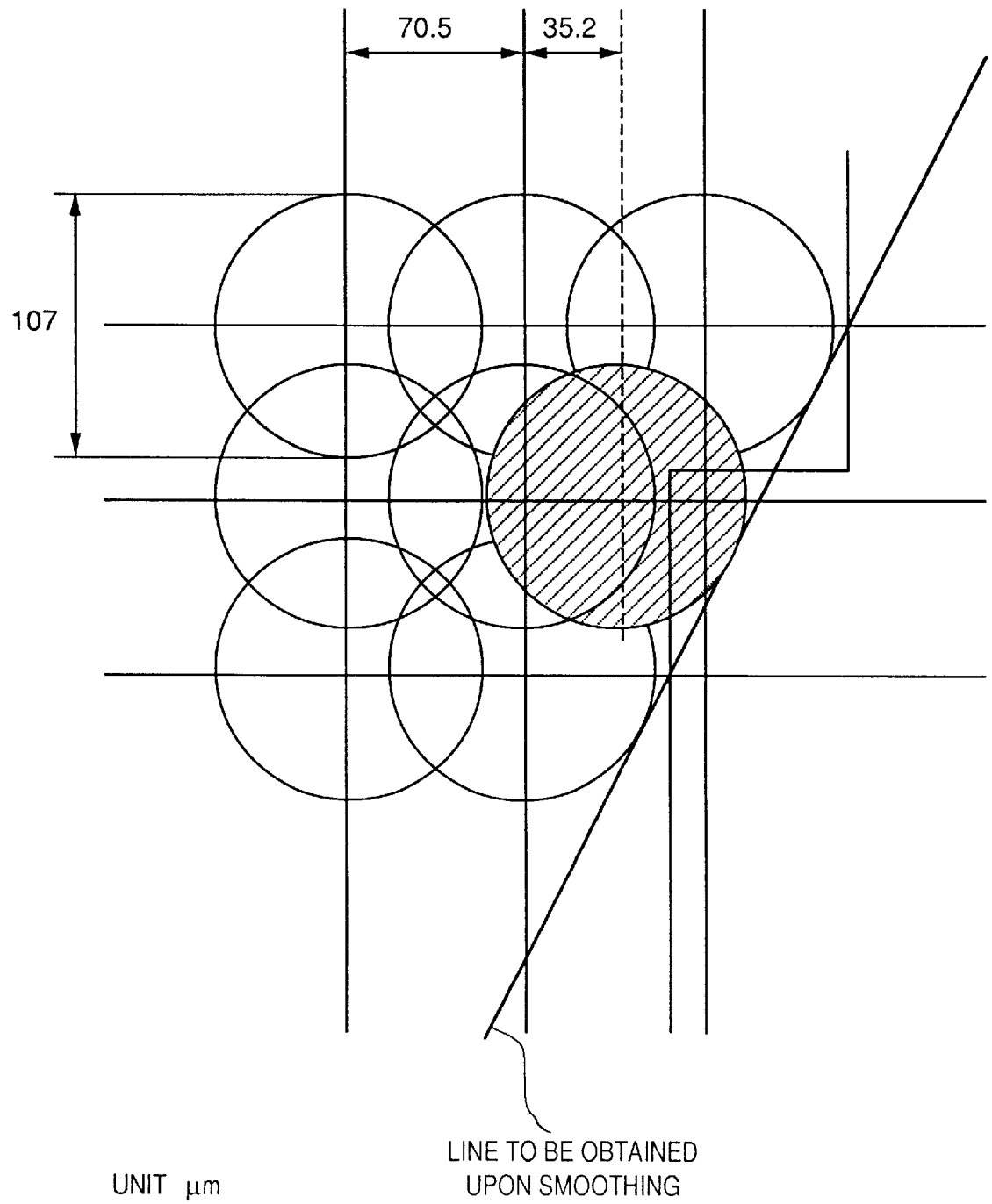
FIG. 17 is a view showing a smoothing example by a conventional intermesh method.
Figure 18:
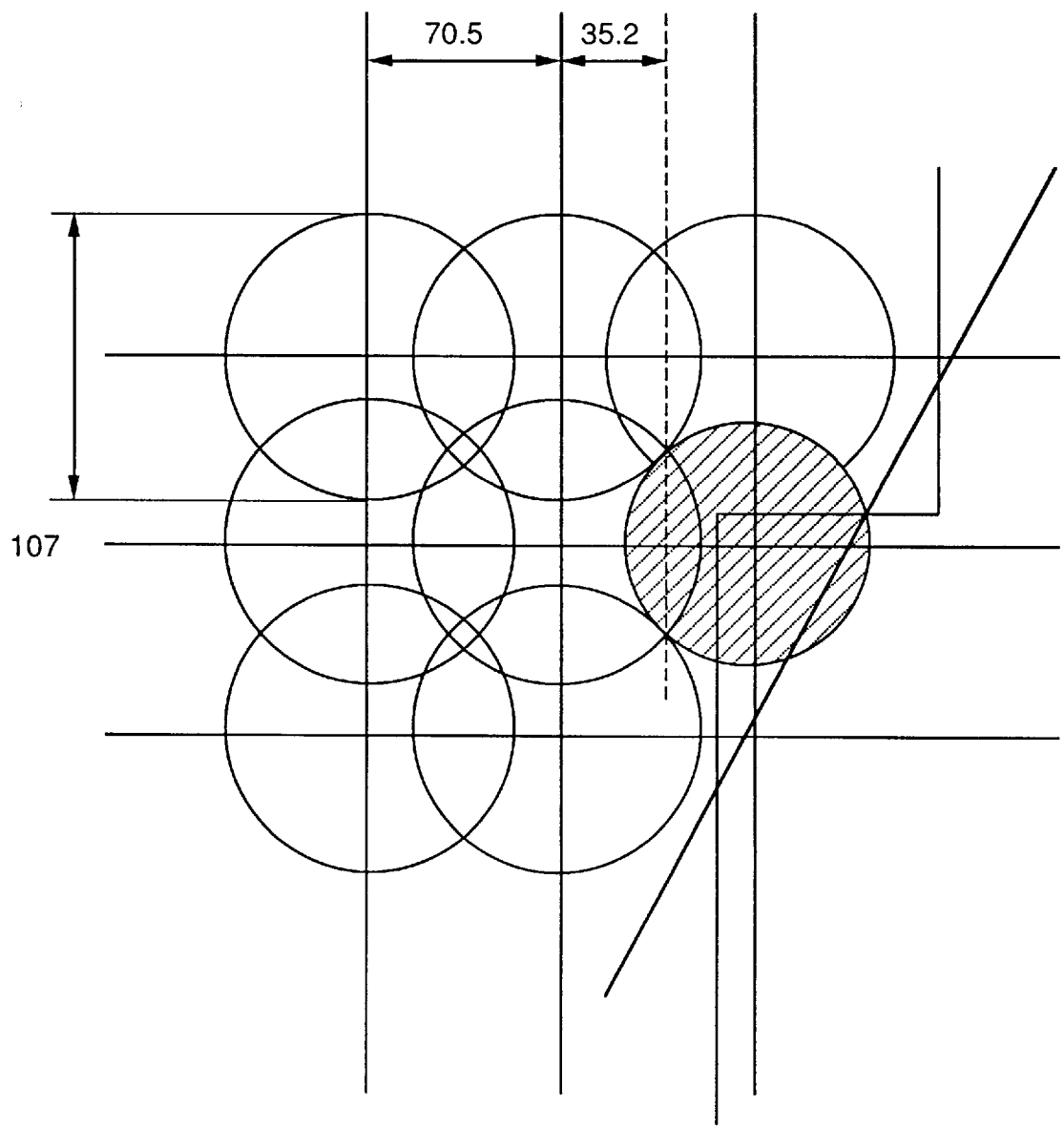
FIG. 18 is a view showing another conventional smoothing example.

FIG. 17 is a view showing a state wherein smoothing is performed by the conventional smoothing method according to an intermesh method. In this method, a dot having the same size is added at a position offset by a distance (35 $\mu$m) corresponding to a resolution of 720 DPI. FIG. 18 is a view showing another conventional method in which a dot having a smaller dot size is added while the resolution is kept at 360 DPI. Although not shown, a dot having a smaller dot size may be printed at a position corresponding to a resolution of 720 DPI.

Figure 19:
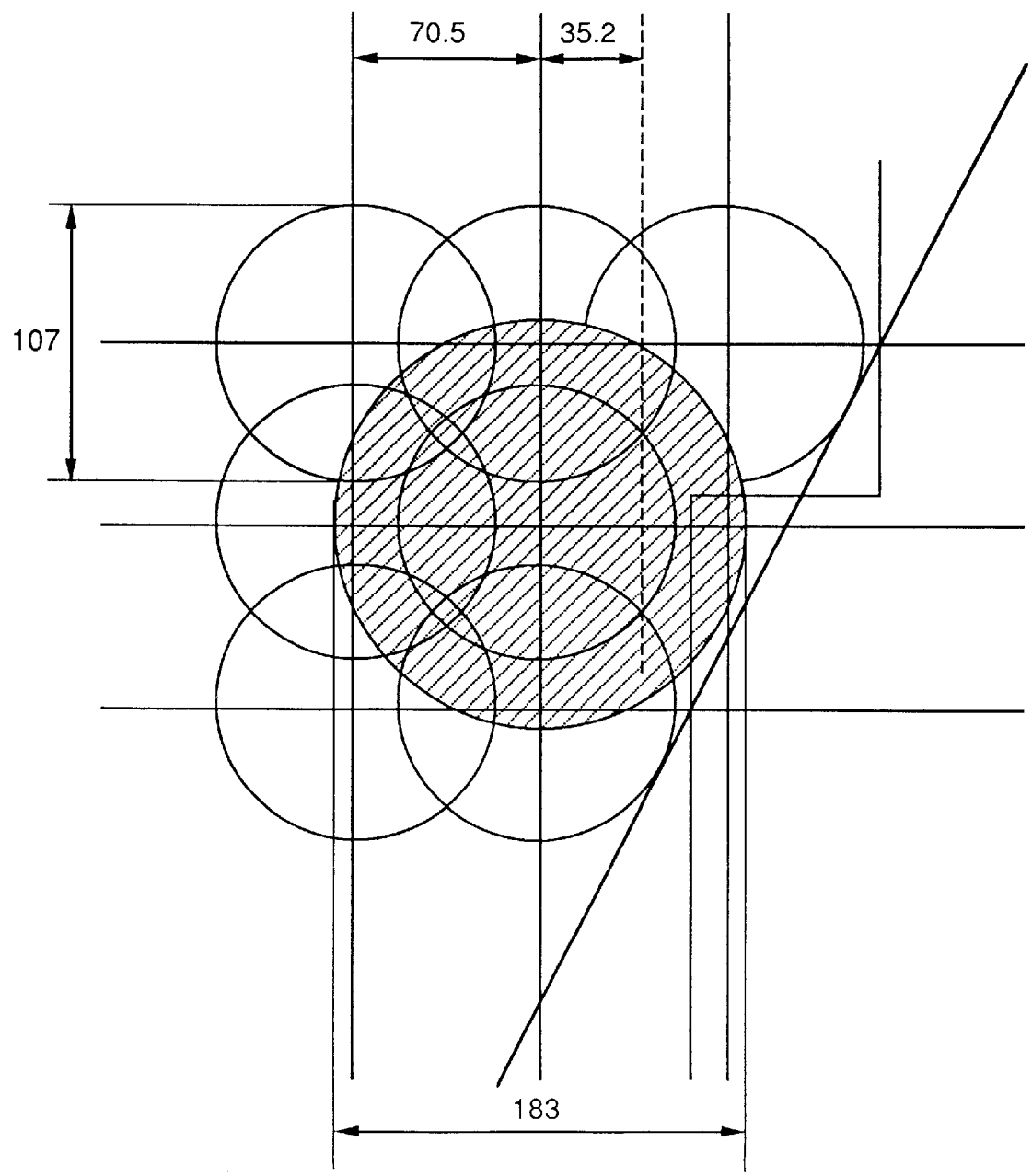
FIG. 19 is a view showing a smoothing example in the fourth embodiment.

FIG. 19 is a view showing the embodiment of the present invention, in which, immediately after dots having a relatively low permeability are normally printed in an amount of 80 pl, a cyan dot having a higher permeability is overprinted on a dot to be smoothed in an amount of 40 pl to increase the dot size to 183 $\mu$m, thereby completing smoothing.

Assume that color inks are ejected on a black ink a plurality of times. In this case, it is assumed that the color inks are ejected on a black dot a plurality of times. As an effective method for maximizing the efficiency of the apparatus, a plurality of color inks are used, and each color is ejected dot by dot. This is because the ejection dot count to be added, which is designated for the target smoothing dot, can be distributed to each memory of cyan, magenta, and yellow and can be ORed. With this processing, the concept of the present invention can be realized without increasing the memory size for a print image. Since the ejection count can be changed, a combination for changing the dot size within a wider range can be obtained.

The present invention can be applied to both a system constituted by a plurality of equipments and an apparatus comprising one equipment. In addition, the present invention can be applied to a case wherein a program is supplied to a system or an apparatus, as a matter of course.

Furthermore, in the foregoing embodiment, a recording apparatus is described that is one of the ink-jet types, in which means (e.g., an electrothermal transducer or laser beam, etc.) is provided for generating thermal energy as energy utilized in order to jet ink, wherein a change in the state of the ink is caused by the thermal energy. With this arrangement, high-density, high-definition recording can be achieved.

With regard to a typical configuration and operating principle, it is preferred that the foregoing be achieved using the basic techniques disclosed in the specifications of U.S. Pat. Nos. 4,723,129 and 4,740,796. This scheme is applicable to both so-called on-demand-type and continuous-type apparatuses. In the case of the on-demand type, at least one drive signal, which provides a sudden temperature rise that exceeds that for film boiling, is applied, in accordance with recording information, to an electrothermal transducer arranged to correspond to a sheet or fluid passageway holding a fluid (ink). As a result, thermal energy is produced in the electrothermal transducer to bring about film boiling on the thermal working surface of the recording head. Accordingly, air bubbles can be formed in the fluid (ink) in one-to-one correspondence with the drive signals. A jetting port is made to jet the fluid (ink) by growth and contraction of the air bubbles so as to form at least ore droplet. If the drive signal has the form of a pulse, growth and contraction of the air bubbles can be made to take place rapidly and in appropriate fashion. This is preferred since it will be possible to achieve fluid (ink) jetting having excellent response. Signals described in the specifications of U.S. Pat. Nos. 4,463,359 and 4,345,262 are suitable as drive pulses having this pulse shape. It should be noted that even better recording can be performed by employing the conditions described in the specification of U.S. Pat. No. 4,313,124, which discloses an invention relating to the rate of increase in the temperature of the abovementioned thermal working surface.

In addition to the combination of the jetting port, fluid passageway and electrothermal transducer (in which the fluid passageway is linear or right-angled) disclosed as the construction of the recording head in each of the above-mentioned specifications, the present invention covers also an arrangement using the art described in the specifications of U.S. Pat. Nos. 4,558,333 and 4,459,600, which disclose elements disposed in an area in which the thermal working portion is curved. Further, it is permissible to adopt an arrangement based upon Japanese Patent Application Laid-Open No. 59-123670, which discloses a configuration having a common slot for the jetting portions of a plurality of electrothermal transducers, or Japanese Patent Application Laid-Open No. 59-138461, which discloses a configuration having openings made to correspond to the jetting portions, wherein the openings absorb pressure waves of thermal energy.e The present invention is effective also in a case in which use is made of a recording head secured to the main body of the apparatus even in the serial-type arrangement of the foregoing example; a freely exchangeable chip-type recording head attached to the main body of the apparatus and capable of being electrically connected to the main body of the apparatus and of supplying ink from the main body; or a cartridge-type recording head in which an ink tank is integrally provided on the recording head itself.

With regard to the type of mounted recording head and the number thereof, only one head is provided in case of monochromatic ink, for example, and a plurality of heads are provided for corresponding ones of a plurality of inks of different color or densities. More specifically, the recording mode of the recording apparatus is not limited merely to a recording mode for a mainstream color only, such as the color black. The recording head can have a unitary construction or a plurality of recording heads can be combined.

The invention is effective also in an apparatus having at least one recording mode for a plurality of different colors or for full-color recording using mixed colors.

Further, ink is described as being the fluid in the embodiments of the invention set forth above. The ink used may be one which solidifies at room temperature or lower, or one which softens of liquefies at room temperature. Alternatively, in an ink-jet arrangement, generally the ink is temperature-controlled by regulating the temperature of the ink itself within a temperature range of between 30° C. and 70° C. so that the viscosity of the ink will reside in a region that allows stable jetting of the ink. Therefore, it is permissible to use an ink liquefied when the recording signal is applied. In order to positively prevent elevated temperature due to thermal energy when this is used as the energy for converting the ink from the solid state to the liquid state, or in order to prevent evaporation of the ink, it is permissible to use an ink which solidifies when left standing but which liquefies when heated. In any case, the present invention is applicable also in a case where use is made of an ink which solidifies in response to application of thermal energy, such as an ink solidified by application of thermal energy conforming to a recording signal or ink which has already begun to solidify at the moment it reaches the recording medium. Such inks may be used in a form in which they oppose the electrothermal transducer in a state in which they are held as a liquid or solid in the recesses or through-holes of a porous sheet, as described in Japanese Patent Application Laid-Open Nos. 54-56847 and 60-71260. In the present invention, the most effective method of dealing with these inks is the above-described method of film boiling.

Furthermore, as to the form of the recording apparatus, use is not limited to an image output terminal of an image processing apparatus such as a computer. Other configurations include a copying machine in combination with a reader or the like, a facsimile machine having a transmitting/receiving function, etc.

It goes without saying that the invention is applicable also to a case where the object of the invention is attained by supplying a program to a system or apparatus.

What is claimed:

1. An image output method comprising the steps of:
   inputting image data;
   extracting a pixel subjected to smoothing;
   exclusive-ORing the input image data with image data corresponding to the extracted pixel;
   printing the exclusive-ORed image data; and
   printing image data corresponding to the extracted pixel, wherein a size of a dot printed based on the image data corresponding to the extracted pixel is larger than a size of a dot printed based on the exclusive-ORed image data.

2. The method according to claim 1, further comprising the step of extracting an outline portion from the image data.

3. The method according to claim 2, further comprising the steps of:
   determining a pixel to be added to or deleted from pixels forming said outline portion, adding or deleting said determined pixel of said outline portion; and
   determining a pixel whose dot size is to be changed from said pixels forming said outline portion,
   wherein the image data obtained upon adding or deleting said pixel is printed with a first dot size, and said pixel whose dot size is determined to be changed is printed with a second dot size larger than the first dot size.

4. The method according to claim 3, wherein said pixel to be added or deleted and said pixel whose dot size is to be changed are determined by comparing the input image data with a predetermined mask pattern.

5. The method according to claim 3, wherein said pixel having the second dot size is printed using a recording agent in an amount larger than that for said pixel having the first dot size.

6. The method according to claim 3, wherein said pixel having the second dot size is printed using a recording agent having a permeability higher than that for said pixel having the first dot size.

7. The method according to claim 3, wherein said pixel having the second dot size is printed by ejecting a recording agent on one pixel a plurality of times.

8. The method according to claim 3, wherein said pixel having the second dot size is printed by ejecting different recording agents on one pixel a plurality of times.

9. The method according to claim 8, wherein said different recording agents have different colors.

10. The method according to claim 8, wherein said different recording agents have different concentrations.

11. The method according to claim 1, wherein the printing step comprises printing a pixel by applying ink to a recording medium.

12. An image output apparatus comprising:
input means for inputting image data;
first holding means for holding the input image data;
extracting means for extracting from the image data a pixel subjected to smoothing;
second holding means for holding the image data of the extracted pixel;
exclusive-OR means for exclusive-ORing the input image data held by said first holding means with the image data held by said second holding means;
first output means for printing the image data exclusive-ORed by said exclusive-OR means; and
second output means for printing the image data held by said second holding means and corresponding to the extracted pixel, wherein a size of a dot printed based on the image data corresponding to the extracted pixel is larger than a size of the dot printed based on the exclusive-ORed image data.

13. The apparatus according to claim 12, wherein said first output means and said second output means are parallelly arranged in a main scanning direction.

14. The apparatus according to claim 12, wherein said first output means and said second output means are parallelly arranged in a sub-scanning direction.

15. The apparatus according to claim 12, further comprising second extracting means for extracting an outline portion from the image data.

16. The apparatus according to claim 15, further comprising:
first determining means for determining addition and deletion of a pixel of pixels forming said outline portion extracted by said second extracting means;
second determining means for determining a pixel whose dot size is to be changed from said pixels forming said outline portion; and
dot adjusting means for performing addition and deletion of the image data held by said first holding means in accordance with a determination result from said first determining means,
wherein said second holding means holds said dot whose dot size is to be changed, said dot being determined by said second determining means.

17. The apparatus according to claim 16, wherein
said first determining means refers to a predetermined mask pattern to determine addition and deletion of said pixel, and
said second determining means refers to a predetermined mask pattern to determine said pixel whose dot size is to be changed.

18. The apparatus according to claim 17, further comprising pattern holding means for holding said predetermined mask pattern.

19. The apparatus according to claim 12, wherein said second output means performs printing with a recording agent in an amount larger than that for said first output means.

20. The apparatus according to claim 12, wherein said second output means performs printing with a recording agent having a permeability higher than that for said first output means.

21. The apparatus according to claim 12, wherein said second output means performs printing by ejecting a recording agent a plurality of times.

22. The apparatus according to claim 12, wherein said second output means performs printing by ejecting different recording agents a plurality of times.

23. The apparatus according to claim 22, wherein said recording agents have different colors.

24. The apparatus according to claim 22, wherein said recording agents have different concentrations.

25. The apparatus according to claim 20, wherein said first holding means holds black image data, and said second holding means holds color image data.

26. The apparatus according to claim 12, wherein said first output means and said second output means comprise an ink-jet printer for ejecting an ink to perform recording.

27. The apparatus according to claim 12, wherein said first output means and said second output means comprise an ink-jet printer having a recording head comprising an electrothermal transducer for generating thermal energy to be applied to ink to eject the ink.

28. The apparatus according to claim 12, wherein said image output apparatus is incorporated as a printing device in a facsimile apparatus.

29. The apparatus according to claim 12, wherein said image output apparatus is incorporated as a printing device in a copying machine.

30. The apparatus according to claim 12, further comprising interface means for communicating with a computer, wherein said image output apparatus is incorporated as a printing device in a terminal apparatus of the computer via said interface means.

* * * * *

UNITED STATES PATENT AND TRADEMARK OFFICE
CERTIFICATE OF CORRECTION

PATENT NO. : 5,975,673
DATED : November 2, 1999
INVENTOR(S) : Naoji Ohtsuka, et al.

It is certified that error appears in the above-identified patent and that said Letters Patent is hereby corrected as shown below:

[56] References Cited:
U.S. PATENT DOCUMENTS, after
"4,608,577  8/1986  Hori . . . . . . . . . . . . . . .    347/66" the following should be inserted:
--4,635,078  1/1987  Sakurada et al . . . . . . . .    347/15--.

Column 2:
Line 7, "effect" should read --effects--.
Line 29, "higher-solution" should read --high-resolution--.

Column 8:
Line 25, "ink," should read --inks,--.

Column 12:
Line 6, "½," should read --½ a--.

Column 13:
Line 20, "ore" should read --one--.

Column 14:
Line 40, "claimed:" should read --claimed is:--.

Signed and Sealed this

Third Day of July, 2001

*Attest:*

*Attesting Officer*

NICHOLAS P. GODICI
*Acting Director of the United States Patent and Trademark Office*